(12) United States Patent
Nikitin

(10) Patent No.: US 9,843,271 B1
(45) Date of Patent: Dec. 12, 2017

(54) CONTROLLERS FOR REGULATED POWER INVERTERS, AC/DC, AND DC/DC CONVERTERS

(71) Applicant: Alexei V. Nikitin, Wamego, KS (US)

(72) Inventor: Alexei V. Nikitin, Wamego, KS (US)

(*) Notice: Subject to any disclaimer, the term of this patent is extended or adjusted under 35 U.S.C. 154(b) by 0 days.

(21) Appl. No.: 15/646,692

(22) Filed: Jul. 11, 2017

Related U.S. Application Data

(60) Provisional application No. 62/362,764, filed on Jul. 15, 2016, provisional application No. 62/510,990, filed on May 25, 2017.

(51) Int. Cl.
*H02M 7/217* (2006.01)
*H02M 7/539* (2006.01)
*H02M 1/44* (2007.01)

(52) U.S. Cl.
CPC ............. *H02M 7/217* (2013.01); *H02M 1/44* (2013.01); *H02M 7/539* (2013.01)

(58) Field of Classification Search
CPC ......... H02M 7/217; H02M 1/44; H02M 7/539
See application file for complete search history.

(56) References Cited

U.S. PATENT DOCUMENTS

| | | | |
|---|---|---|---|
| 8,694,273 B2* | 4/2014 | Nikitin | H03H 11/0405 |
| | | | 702/70 |
| 9,130,455 B2* | 9/2015 | Nikitin | H02M 3/156 |
| 9,467,046 B2* | 10/2016 | Nikitin | H02M 3/156 |
| 2011/0133682 A1* | 6/2011 | Egger | H02P 8/12 |
| | | | 318/685 |
| 2013/0043852 A1* | 2/2013 | Marsili | H02M 3/157 |
| | | | 323/283 |

* cited by examiner

*Primary Examiner* — Emily P Pham
(74) *Attorney, Agent, or Firm* — Dale J. Ream

(57) ABSTRACT

The present invention relates to methods and corresponding apparatus for regulated and efficient DC-to-AC conversion with high power quality, and to methods and corresponding apparatus for regulation and control of said DC-to-AC conversion. The invention further relates to methods and corresponding apparatus for regulation and control of AC-to-DC and/or DC-to-DC conversion.

20 Claims, 34 Drawing Sheets

$V_{fb} \propto V_{out}$ for voltage, $V_{fb} \propto I^*$ for current, and $V_{fb} \propto V_{out} \times I^*$ for power regulation

CONTROLLERS FOR REGULATED POWER INVERTERS, AC/DC, AND DC/DC CONVERTERS

CROSS REFERENCES TO RELATED APPLICATIONS

This application claims the benefit of the U.S. provisional patent applications 62/362,764 filed on 15 Jul. 2016, and 62/510,990 filed on 25 May 2017.

STATEMENT REGARDING FEDERALLY SPONSORED RESEARCH OR DEVELOPMENT

None.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to methods and corresponding apparatus for regulated and efficient DC-to-AC conversion with high power quality, and to methods and corresponding apparatus for regulation and control of said DC-to-AC conversion. The invention further relates to methods and corresponding apparatus for regulation and control of AC-to-DC and/or DC-to-DC conversion.

BACKGROUND

A power inverter, or an inverter, or a DC-to-AC converter, is an electronic device or circuitry that changes direct current (DC) to alternating current (AC) (e.g. single- and/or 3-phase).

A power inverter would typically be a switching inverter that uses a switching device (solid-state or mechanical) to change DC to AC. There are may be many different power circuit topologies and control strategies used in inverter designs. Different design approaches address various issues that may be more or less important depending on the way that the inverter is intended to be used. For example, an inverter may use an H bridge that is built with four switches (solid-state or mechanical), that enables a voltage to be applied across a load in either direction.

Given a particular power circuit topology, an appropriate control strategy may need to be chosen in order to meet the desired inverter specifications, e.g. in terms of input and output voltages, AC and switching frequencies, output power and power density, power quality, efficiency, cost, and so on.

For example, one of the most obvious approaches to increase power density would be to increase the frequency that the inverter operates at ("switching frequency"). This may be done by employing wide-bandgap (WBG) semiconductors that use materials such as gallium nitride (GaN) or silicon carbide (SiC) and can function at higher power loads and frequencies, allowing for smaller, more energy-efficient devices.

A typical way to control a switching inverter is by mathematically defining voltage and/or current relations at different switching states to produce the "desired" output, obtaining the appropriate digitally sampled voltage and/or current values, then using numerical signal processing tools to implement an appropriate algorithm to control the switches [1]. However, such a straightforward approach often calls for performance compromises based on the ability to accurately define the voltage and current relations for various topological stages and load conditions (e.g. nonlinear loads), and to account for nonidealities and time variances of the components (since the values of, e.g., resistances, capacitances, inductances, switches' behavior, etc., may change in time due to the temperature changes, mechanical stress/vibrations, aging, etc.). In addition, a control processor for the inverter must meet a number of real-time processing challenges, especially at high switching frequencies, in order to effectively execute the algorithms required for efficient DC/AC conversion and circuit protection. Various design and implementation compromises are often made in order to overcome these challenges, and those can negatively impact the complexity, reliability, cost, and performance of the inverter.

Thus there is a need in a simple analog (i.e. continuous and real-time) controller that would allow us to bypass the detailed analysis of various topological stages during a switching cycle altogether, thus avoiding the pitfalls and limitations of straightforward digital techniques.

Further, there is a need in such a simple controller that (i) does not require any current sensors, or additional start-up and management means, (ii) provides robust, high quality (e.g. low voltage and current harmonic distortions), and well regulated AC outputs for a wide range of power factor loads, including highly nonlinear loads, and also (iii) offers multiple ways to optimize the cost-size-weight-performance tradespace.

SUMMARY

The present invention overcomes the limitations of the prior art by introducing an Inductor Current Mapping, or ICM controller. The ICM controller offers various overall advantages over respective digital controllers, and may provide multiple ways to optimize the cost-size-weight-performance tradespace.

In the detailed description that follows, we first introduce an idealized concept of an analog ICM controller for an H-bridge power inverter. We show how the "actual" voltage-current relations in the filter inductors may be directly "mapped," by the constraints imposed by two Schmitt triggers, to the voltage relations among the inputs and the output of the controller's analog integrator, providing the desired inverter output that is effectively proportional to the reference voltage. We then discuss the basic operation and properties of this inverter and its associated ICM controller, using particular implementations for illustration. Further, we describe a simple controller modification that may improve the transient responses by utilizing a feedback signal proportional to the load current. Next, we discuss extensions of the ICM concept to other hard- or soft-switching power inverters (e.g. for 3-phase inverters), and for AC/DC and DC/DC converter topologies, and the use of ICM controllers in DC/DC converters for voltage, current, and power regulation.

Further scope and the applicability of the invention will be clarified through the detailed description given hereinafter. It should be understood, however, that the specific examples, while indicating preferred embodiments of the invention, are presented for illustration only. Various changes and modifications within the spirit and scope of the invention should become apparent to those skilled in the art from this detailed description. Furthermore, all the mathematical expressions, diagrams, and the examples of hardware implementations are used only as a descriptive language to convey the inventive ideas clearly, and are not limitative of the claimed invention.

ABBREVIATIONS

AC: alternating (current or voltage);

BCM: Boundary Conduction Mode; BOM: Bill Of Materials;

CCM: Continuous Conduction Mode; CM: Common Mode; COTS: Commercial Off-The-Shelf;

DC: direct (current or voltage), or constant polarity (current or voltage); DCM: Discontinuous Conduction Mode; DCR: DC Resistance of an inductor; DM: Differential Mode; DSP: Digital Signal Processing/Processor;

EMC: electromagnetic compatibility; e.m.f.: electromotive force; EMI: electromagnetic interference; ESR: Equivalent Series Resistance;

FCS: Frequency Control Signal;

GaN: Gallium nitride;

ICM: Inductor Current Mapping; IGBT: Insulated-Gate Bipolar Transistor;

MATLAB: MATrix LABoratory (numerical computing environment and fourth-generation programming language developed by MathWorks); MOS: Metal-Oxide-Semiconductor; MOSFET: Metal Oxide Semiconductor Field-Effect Transistor; MTBF: Mean Time Between Failures;

NDL: Nonlinear Differential Limiter;

PF: Power Factor; PFC: Power Factor Correction; PoL: Point-of-Load; PSD: Power Spectral Density; PSM: Power Save Mode; PWM: Pulse-Width Modulator;

RFI: Radio Frequency Interference; RMS: Root Mean Square;

SCS: Switch Control Signal; SiC: Silicon carbide; SMPS: Switched-Mode Power Supply; SMVF: Switched-Mode Voltage Follower; SMVM: Switched-Mode Voltage Mirror; SNR: Signal to Noise Ratio; SCC: Switch Control Circuit;

THD: Total Harmonic Distortion;

UAV: Unmanned Aerial Vehicle; ULISR: Ultra Linear Isolated Switching Rectifier; ULSR(U): Ultra Linear Switching Rectifier (Unit);

VN: Virtual Neutral; VRM: Voltage Regulator Module;

WBG: wide-bandgap;

ZVS: Zero Voltage Switching; ZVT: Zero Voltage Transition;

DETAILED DESCRIPTION

Figure 1:
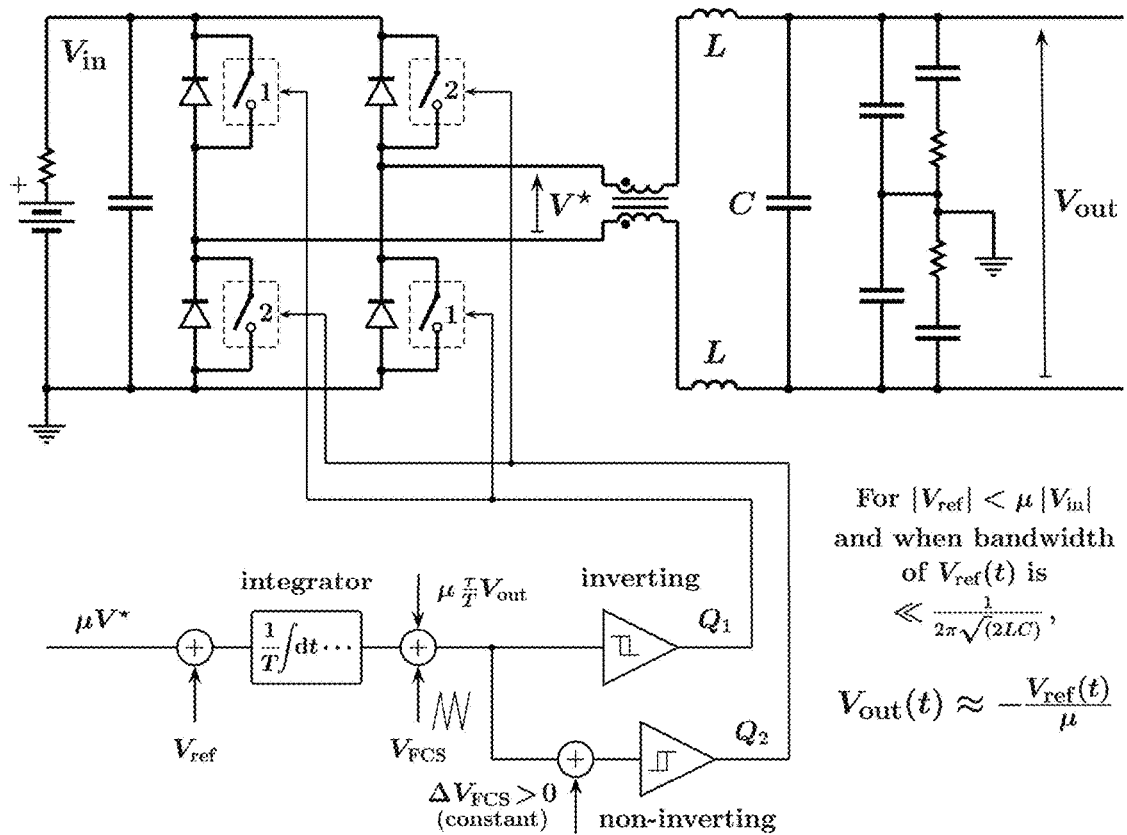
FIG. 1. Basic diagram of an asynchronous buck inverter of the present invention and its associated controller.

1 Illustrative Description of an Asynchronous Buck Inverter of the Present Invention and of its Principles of Operation Let us first consider the simplified circuit diagram shown in FIG. 1.

This power inverter would be capable of converting the DC source voltage $V_{in}$ into the AC output voltage $V_{out}$ that is indicative of the AC reference voltage $V_{ref}$.

In FIG. 1, the DC source voltage $V_{in}$ is shown to be provided by a battery, and the resistor connected in series with the battery indicates the battery's internal resistance.

Capacitance of the capacitor connected in parallel to the battery would need to be sufficiently large (for example, of order 10 µF) to provide a relatively low impedance path for high-frequency current components. A significantly larger capacitance may be used (e.g., of order 1 mF, depending on the battery's internal resistance) to reduce the low frequency (e.g., twice the AC frequency) input current and voltage ripples.

In FIG. 1, the DC source voltage $V_{in}$ is shown to be applied to the input of the H bridge comprising two pairs of switches (labeled "1" and "2"), and the output voltage of the H bridge is the switching voltage V*. For example, when the switches of the 2nd pair are "on" and the switches of the 1st pair are "off", V* would be effectively equal to $V_{in}$, and when the switches of the 1st pair are "on" and the switches of the 2nd pair are "off", V* would be effectively equal to $-V_{in}$.

The diodes explicitly shown in FIG. 1 as connected across the switches in the bridge would enable a non-zero current through the inductors when all switches in the bridge are "off". All switches in the bridge being "off" may be viewed as asynchronous state of the inverter. During the asynchronous state, and depending on the magnitude and the direction of the current through the inductors, the switching voltage V* may have values between $-V_{in}$ and $V_{in}$.

One skilled in the art will recognize that, for example, if the switches are implemented using power MOSFETs, the diodes explicitly shown in FIG. 1 may be the MOSFET body diodes.

The switching voltage V* is further filtered with an LC filtering network to produce the output voltage $V_{out}$. In FIG. 1, this network performs both differential mode (DM) filtering to produce the output differential voltage $V_{out}$, and common mode (CM) filtering to reduce electromagnetic interference (EMI). The DM filtering bandwidth of the LC network should be sufficiently narrow to suppress the switching frequency and its harmonics, while remaining sufficiently larger than the AC frequency.

The DM inductance L in FIG. 1 may be provided by physical inductors, by leakage inductance of the CM choke, or by combination thereof.

The switches of the 1st and 2nd pairs in the bridge are turned "on" or "off" by the respective switch control signals (SCSs), labeled as $Q_1$ and $Q_2$, respectively, in FIG. 1. In the figure, it is implied that the switches are turned "on" by a high value of the respective SCS, and are turned "off" by the low value of the SCS.

In FIG. 1, the input to the integrator (with the integration time constant T) is a sum of the AC reference voltage $V_{ref}$ and a voltage proportional to the switching voltage, µV*, and the output of the integrator contributes to the inputs of both inverting and non-inverting comparators. The comparators may also be characterized by sufficiently large hysteresis, e.g., be configured as Schmitt triggers.

When the comparators are configured as Schmitt triggers, the frequency control signal (FCS) $V_{FCS}$ may be optional, as would be discussed further in the disclosure. Such a configuration of the inverter (without an FCS) would be a free-running configuration.

A (constant) positive threshold offset, or FCS offset, signal $\Delta V_{FCS}$ is added to the input of the non-inverting comparator in FIG. 1. This offset signal enables the SCSs $Q_1$ and $Q_2$ to simultaneously have low values, thus keeping all switches in the bridge "off", and thus enabling an asynchronous state of the inverter.

A periodic FCS $V_{FCS}$ may be added to the inputs of both inverting and non-inverting comparators to enable switching at typically constant (rather than variable) frequency, effectively equal to the FCS frequency.

A signal proportional to the output AC voltage, $\mu \tau/T\, V_{out}$, is added to the inputs of both inverting and non-inverting comparators for damping transient responses of the inverter caused by changes in the load (load current). The mechanism of such damping, and the choice of the time parameter $\tau$, would be discussed further in the disclosure. One skilled in the art will recognize that, equivalently, a signal proportional to the time derivative of the output AC voltage, $\mu \tau \dot{V}_{out}$, may be added to the input of the integrator.

It may be important to point out that the output AC voltage $V_{out}$ of the inverter of the present invention would be effectively independent of the DC source voltage $V_{in}$, as long as (neglecting the voltage drops across the switches and the inductors) $|V_{in}|$ is larger than $|V_{out}|$.

The grounding configuration of the inverter shown in FIG. 1 would be appropriate for the 240 V split phase configuration, similar to what would be found in North American households.

Figure 2:
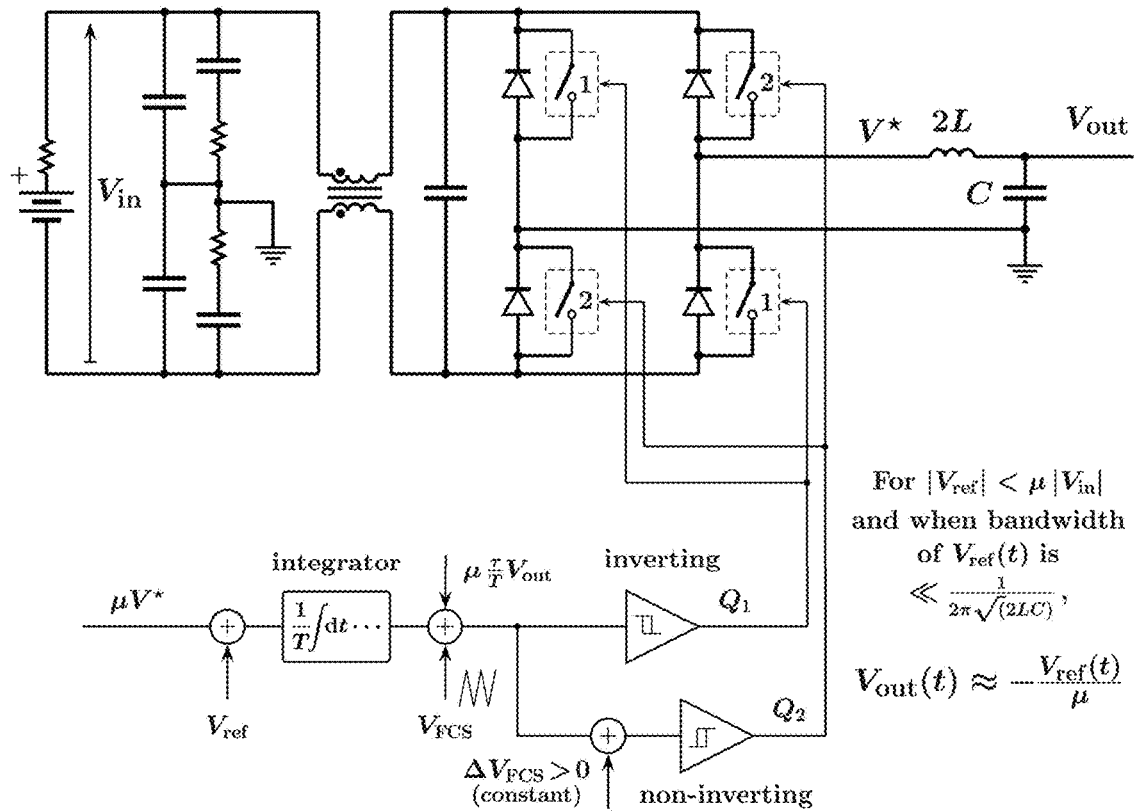
FIG. 2. Alternative grounding configuration of the inverter and its associated controller shown in FIG. 1.

FIG. 2 shows the modification of the inverter appropriate for the 240 V-to-ground configuration, similar to what would be found in European and other households around the world.

One skilled in the art will recognize that the configuration shown in FIG. 2 would allow combining outputs of multiple such inverters into a multi-phase output.

Figure 3:
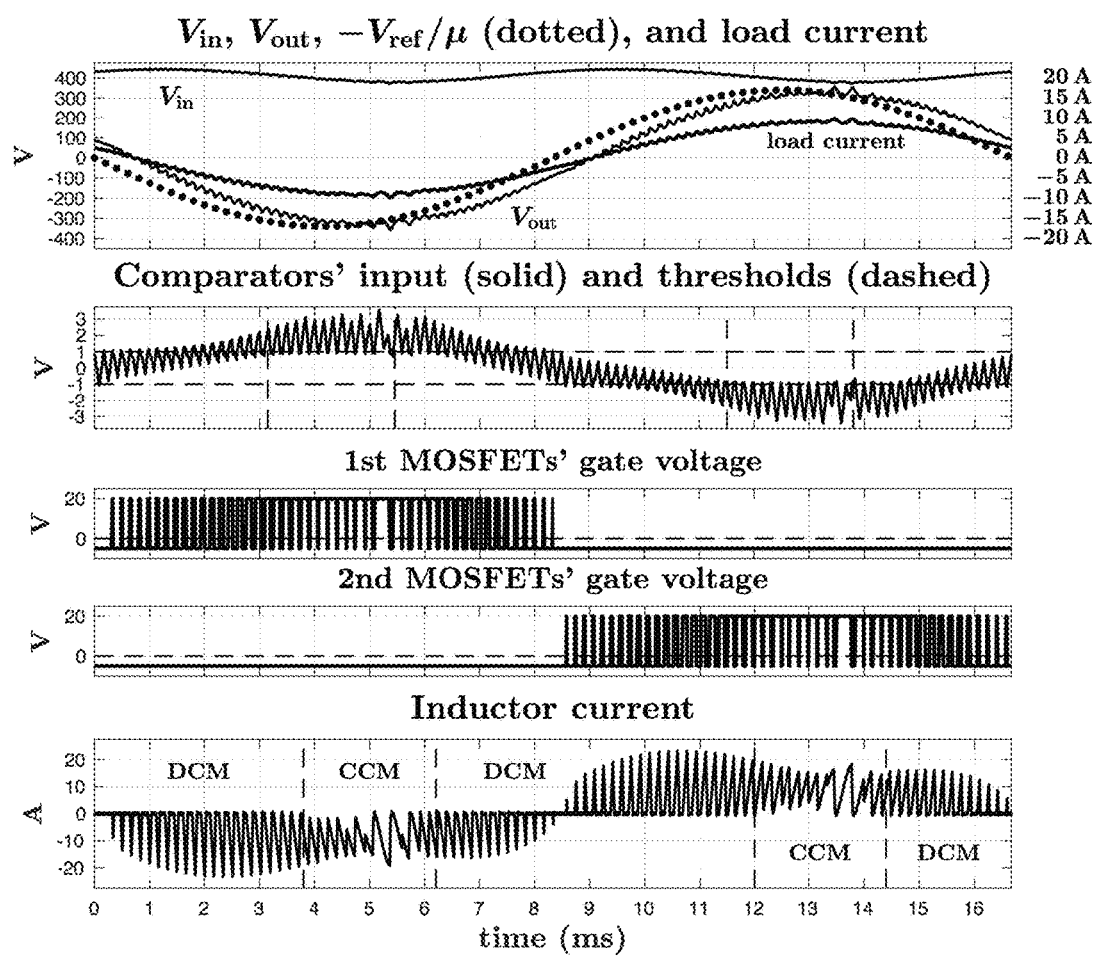
FIG. 3. Illustrative steady-state voltage and current waveforms for the inverter and its associated controller shown in FIGS. 1 and 2. Low FCS frequency (6 kHz) is used for better waveform visibility.

FIG. 3 shows illustrative steady-state voltage and current waveforms for the inverter and its associated controller shown in FIGS. 1 and 2. Low FCS frequency (6 kHz) is used for better waveform visibility.

Figure 4:
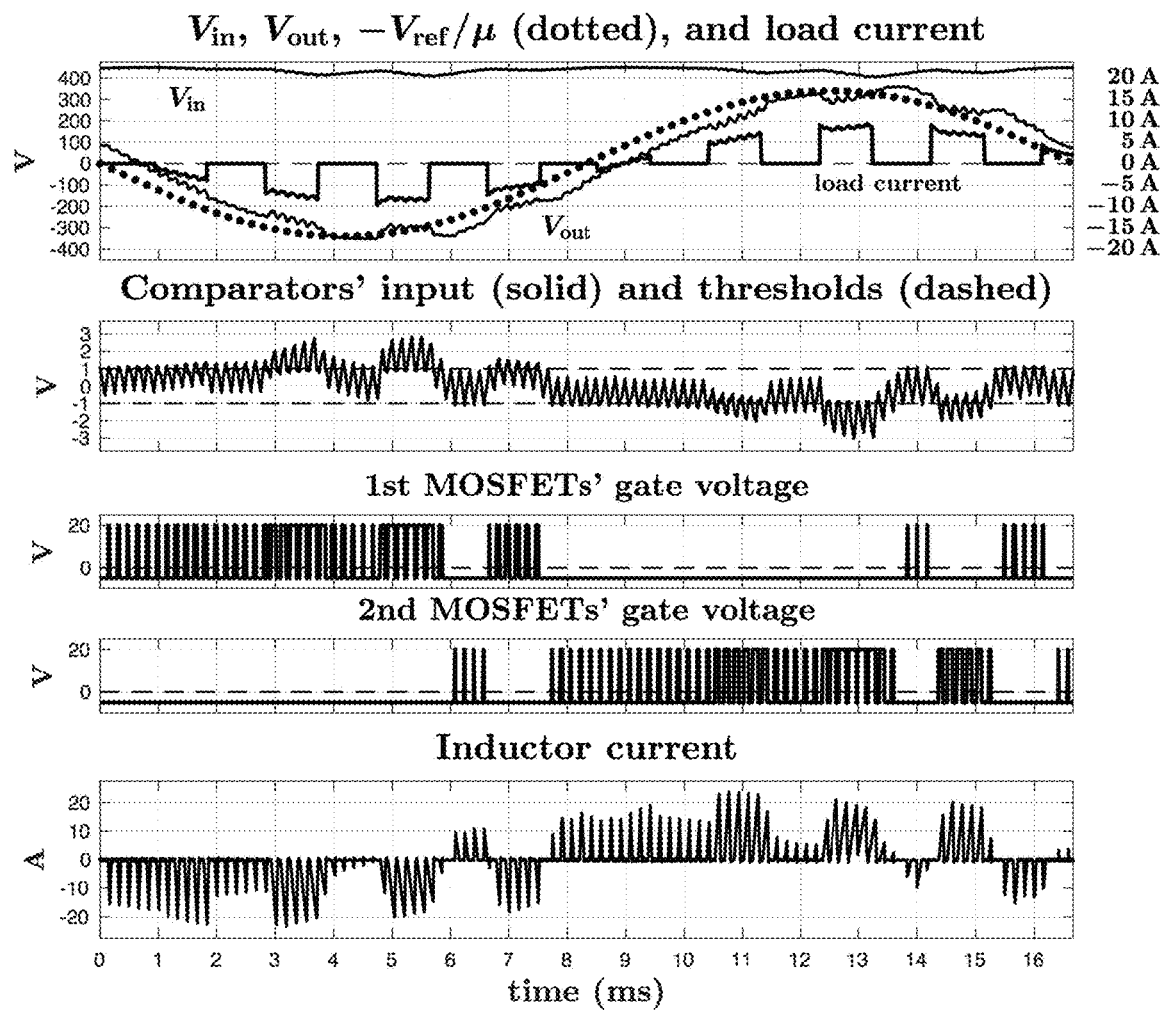
FIG. 4. Illustrative transient voltage and current waveforms for the inverter and its associated controller shown in FIGS. 1 and 2. Low FCS frequency (6 kHz) is used for better waveform visibility.

FIG. 4 shows illustrative transient voltage and current waveforms for the inverter and its associated controller shown in FIGS. 1 and 2. Low FCS frequency (6 kHz) is used for better waveform visibility.

In both FIG. 3 and FIG. 4, low FCS frequency (6 kHz) was used for better waveform visibility, and the switches were implemented using SiC power MOSFETs.

Figure 5:
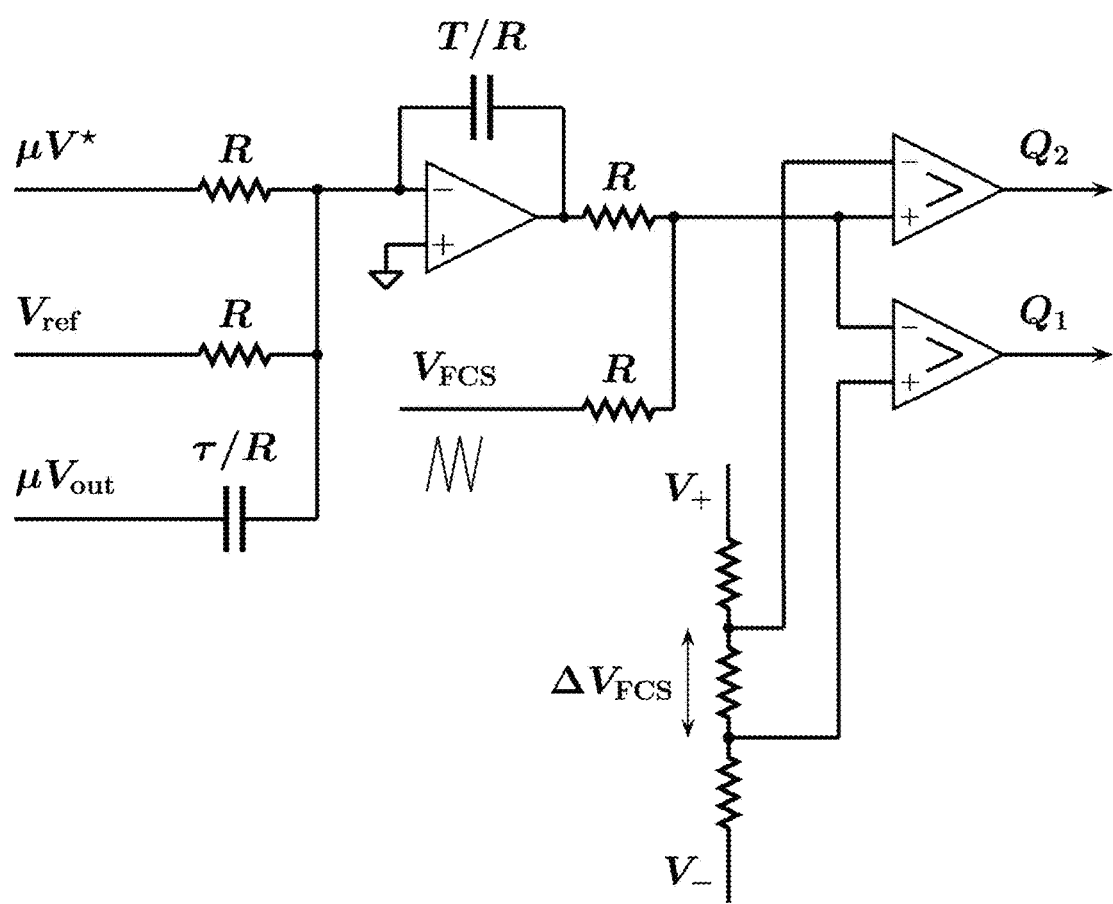
FIG. 5. Illustrative schematic of a controller circuit implementation.

FIG. 5 provides an illustrative schematic of a controller circuit implementation.

One may see that this controller comprises an (inverting) integrator characterized by an integration time constant T, where the integrator input comprises a sum of (1) the signal proportional to the switching voltage, µV*, (2) the reference AC voltage $V_{ref}$, and (3) the signal proportional to the time derivative of the output AC voltage, $\mu\tau\dot{V}_{out}$.

The controller further comprises two comparators outputting the SCSs $Q_1$ and $Q_2$.

A sum of the integrator output and the FCS $V_{FCS}$ (which is a periodic triangle wave in this example) is supplied to the positive terminal of the comparator providing the output $Q_1$, and to the negative terminal of the comparator providing the output $Q_2$.

The reference thresholds for the comparators are provided by a resistive voltage divider as shown in the figure, and the threshold value supplied to the negative terminal of the comparator providing the output $Q_2$ is $\Delta V_{FCS}$ larger than the threshold value supplied to the positive terminal of the comparator providing the output $Q_1$.

Figure 6:
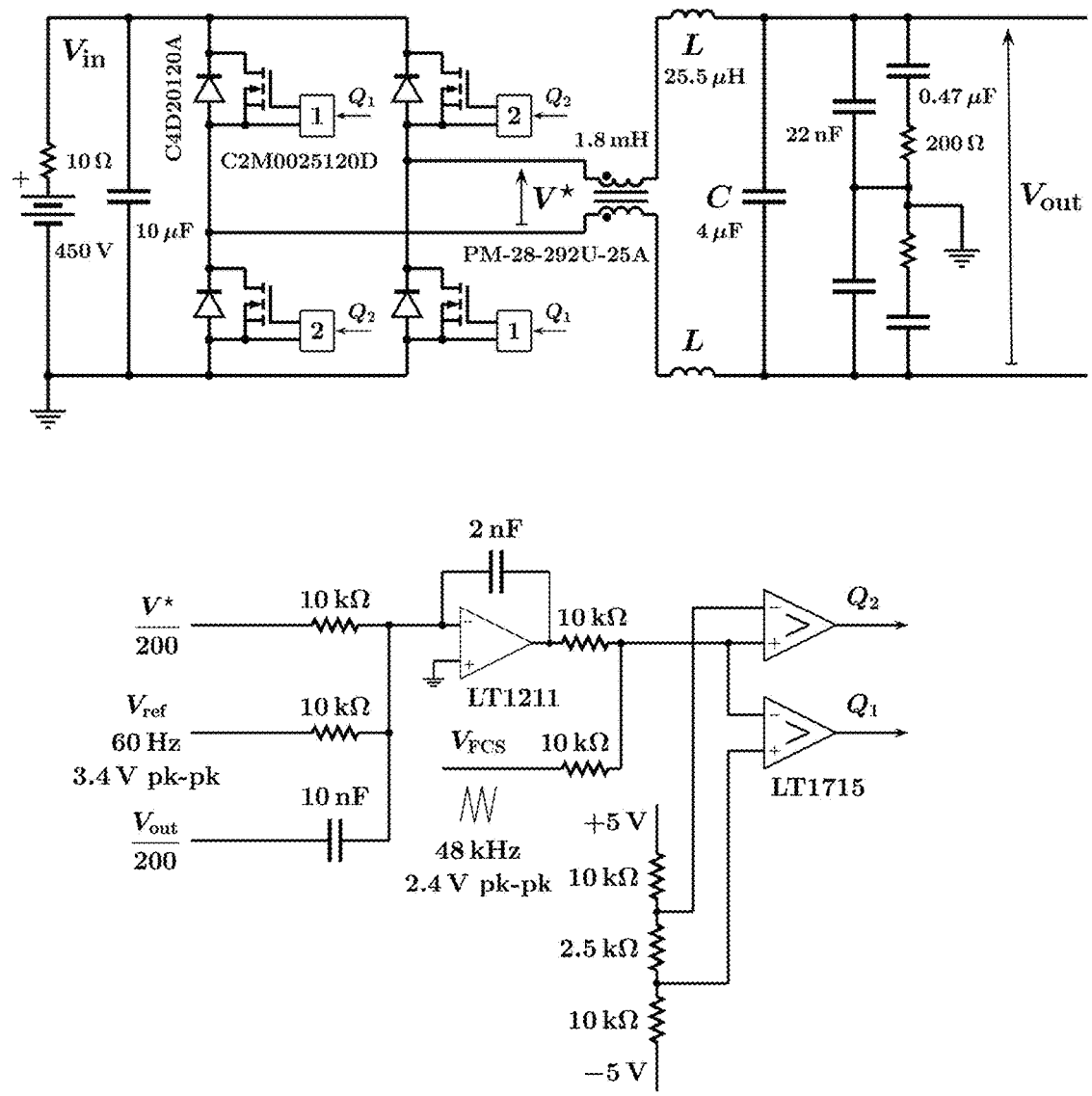
FIG. 6. Illustrative schematic of a particular implementation of the inverter and its associated controller shown in FIG. 1.

To further illustrate the essential features of the asynchronous buck inverter of the present invention, and of its associated controller, let us consider a particular implementation example shown in FIG. 6.

Note that in this example the capacitance of the capacitor connected in parallel to the battery is only 10 μF. It would provide a relatively low impedance path for high-frequency current components. However, a significantly larger capacitance (e.g., of order 1 mF, depending on the battery's internal resistance) should be used to reduce the low frequency (e.g. twice the AC frequency) input current and voltage ripples.

Figure 7:
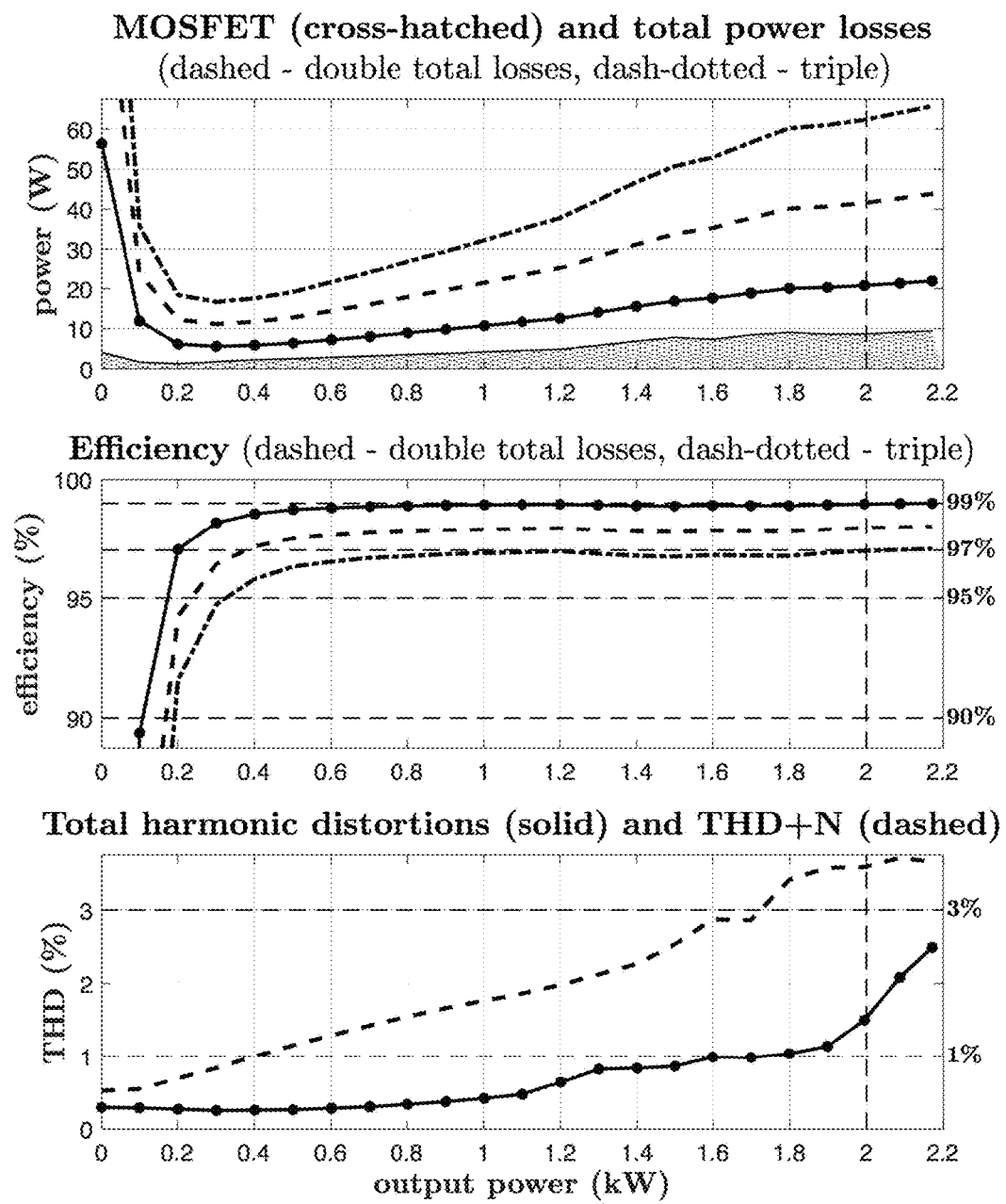
FIG. 7. Simulated MOSFET and total power losses, efficiency, and total harmonic distortions as functions of the output power for the particular inverter implementation shown in FIG. 6 (48 kHz FCS, resistive load).

FIG. 7 shows simulated MOSFET and total power losses, efficiency, and total harmonic distortions as functions of the output power for the particular inverter implementation shown in FIG. 6 (48 kHz FCS, resistive load).

Figure 8:
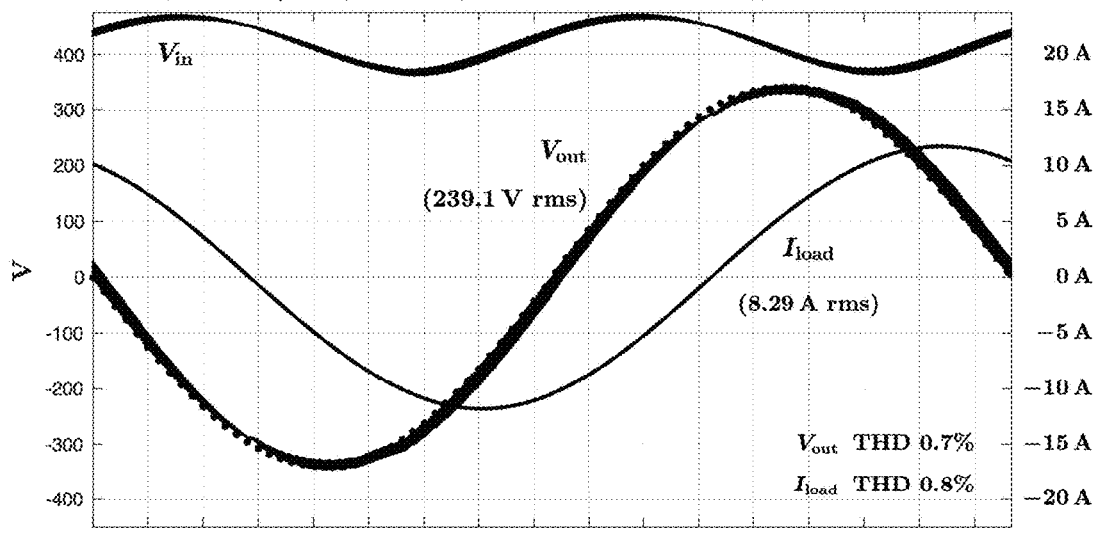
FIG. 8. Illustrative steady-state voltage and current waveforms for a lagging PF=0.5 load (66.2 mH inductor in series with 14.4Ω resistor), for the inverter and its associated controller shown in FIG. 6 (48 kHz FCS).
Figure 8:
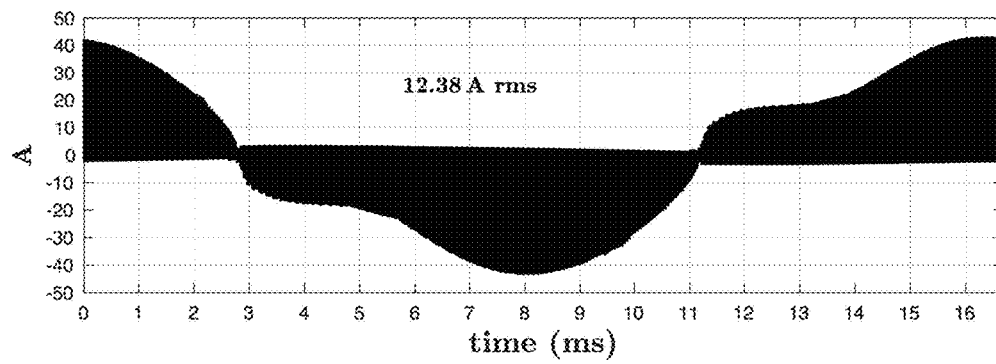

FIG. 8 provides illustrative steady-state voltage and current waveforms for a lagging PF=0.5 load (66.2 mH inductor in series with 14.4Ω resistor), for the inverter and its associated controller shown in FIG. 6 (48 kHz FCS).

Figure 9:
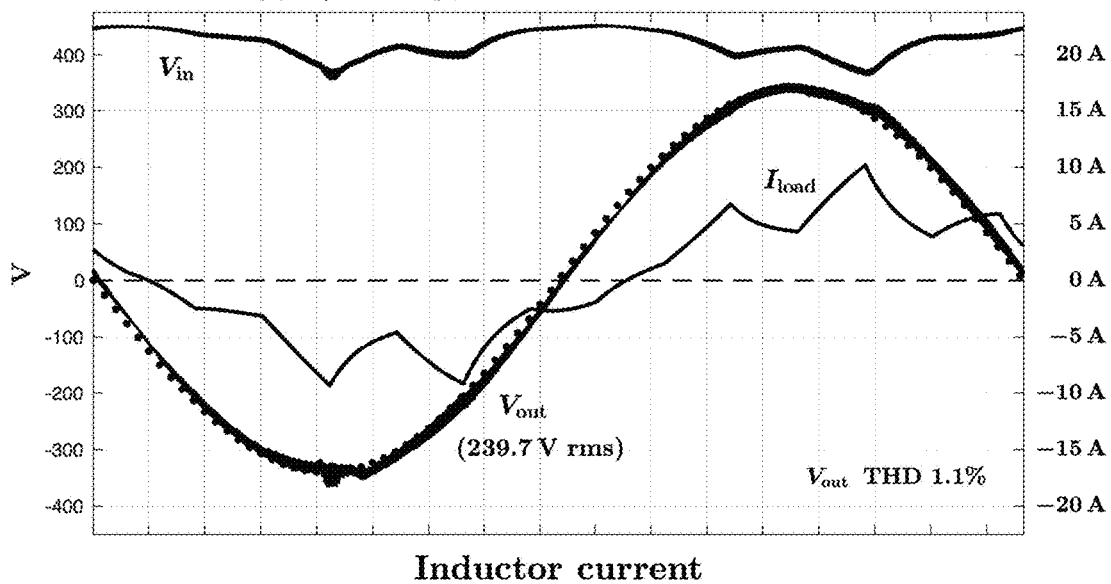
FIG. 9. Illustrative transient voltage and current waveforms for a lagging PF load (50 mH inductor in series with 10.8Ω or 84.4Ω resistors), for the inverter and its associated controller shown in FIG. 6 (48 kHz FCS).
Figure 9:
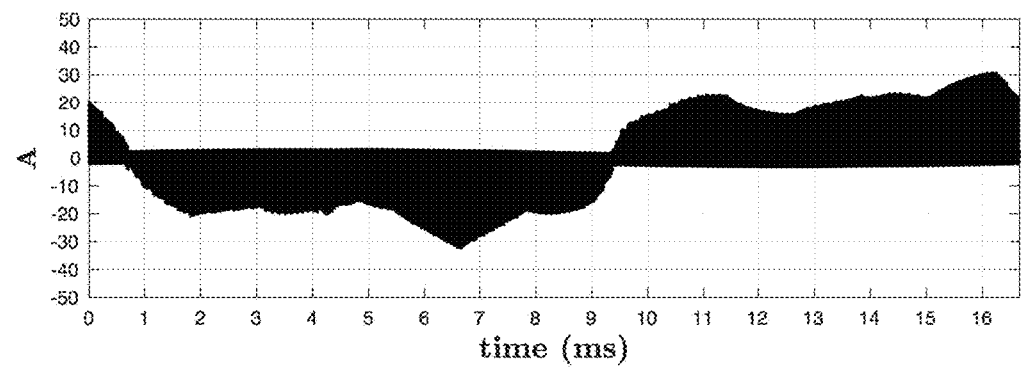

FIG. 9 provides illustrative transient voltage and current waveforms for a lagging PF load (50 mH inductor in series with 10.8Ω or 84.4Ω resistors), for the inverter and its associated controller shown in FIG. 6 (48 kHz FCS).

Figure 10:
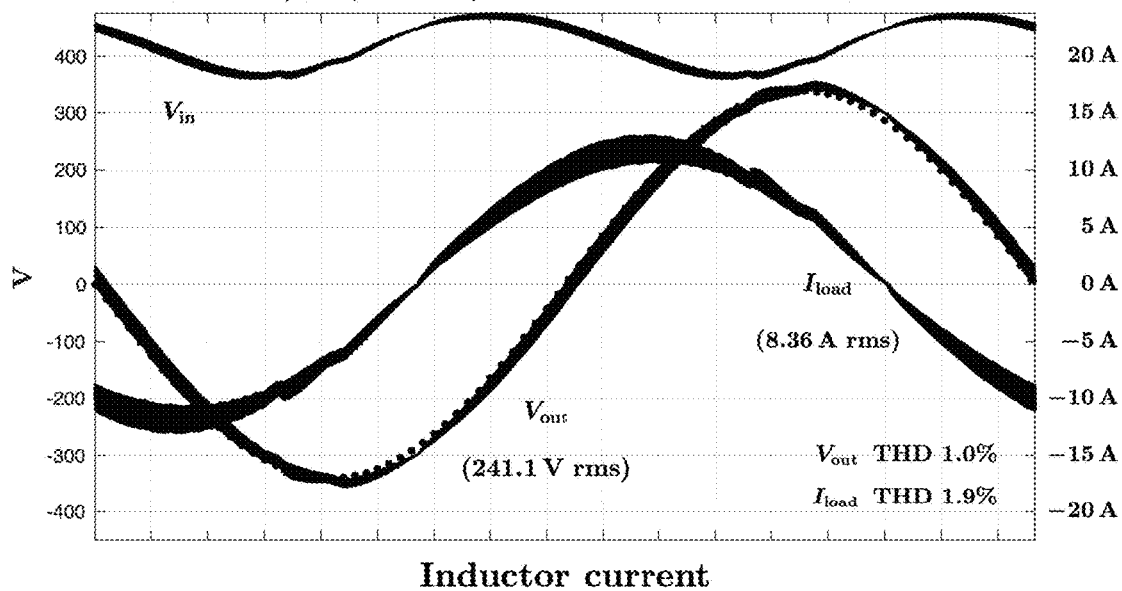
FIG. 10. Illustrative steady-state voltage and current waveforms for a leading PF=0.5 load (106 μF capacitor in series with 14.4Ω resistor), for the inverter and its associated controller shown in FIG. 6 (48 kHz FCS).
Figure 10:
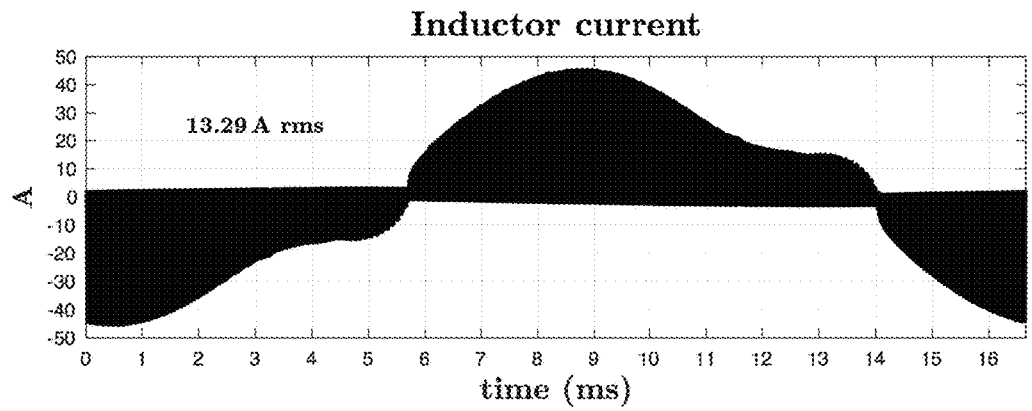

FIG. 10 provides illustrative steady-state voltage and current waveforms for a leading PF=0.5 load (106 μF capacitor in series with 14.4Ω resistor), for the inverter and its associated controller shown in FIG. 6 (48 kHz FCS).

Figure 11:
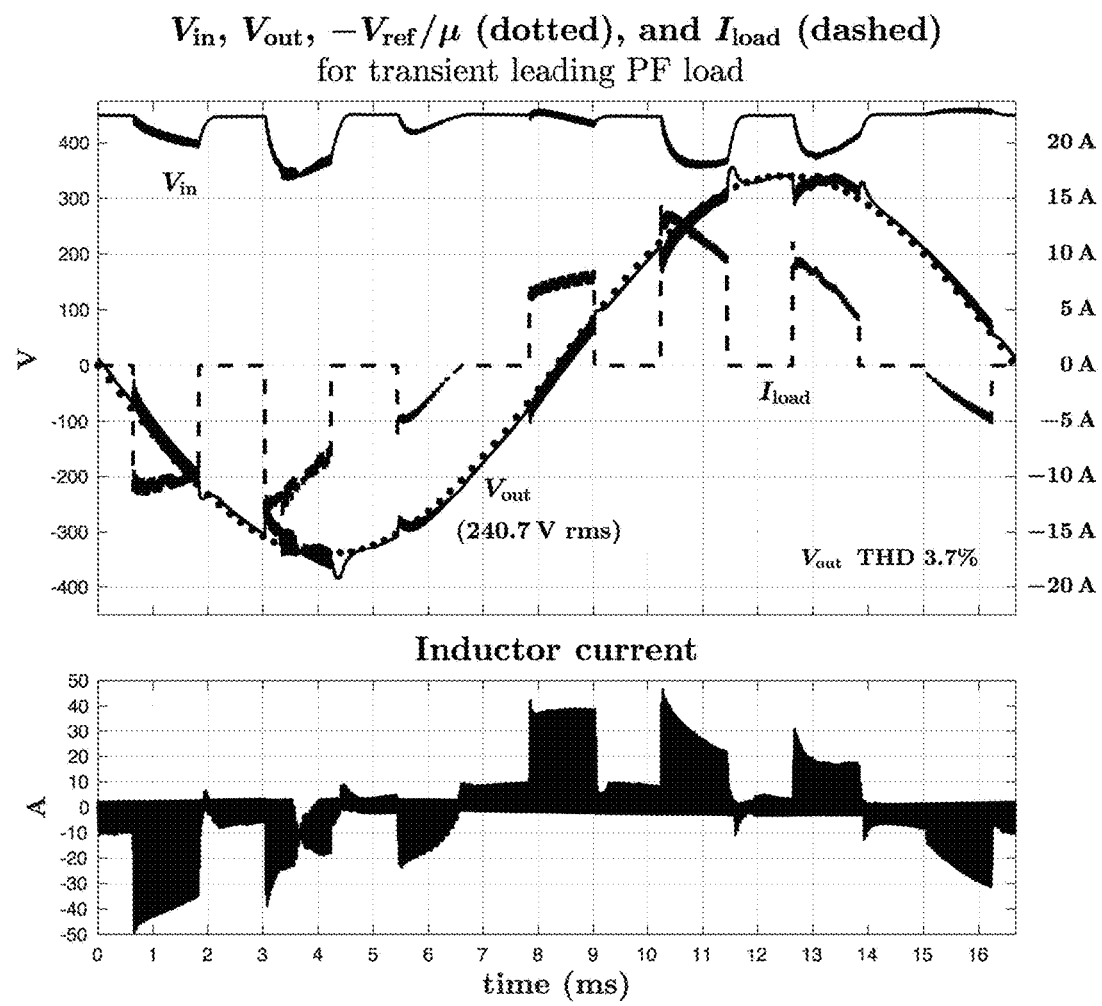
FIG. 11. Illustrative transient voltage and current waveforms for a leading PF load (70.7 μF capacitor in series with 21.6Ω or 1 MΩ resistors), for the inverter and its associated controller shown in FIG. 6 (48 kHz FCS).

FIG. 11 provides illustrative transient voltage and current waveforms for a leading PF load (70.7 μF capacitor in series with 21.6Ω or 1 MΩ resistors), for the inverter and its associated controller shown in FIG. 6 (48 kHz FCS).

Figure 12:
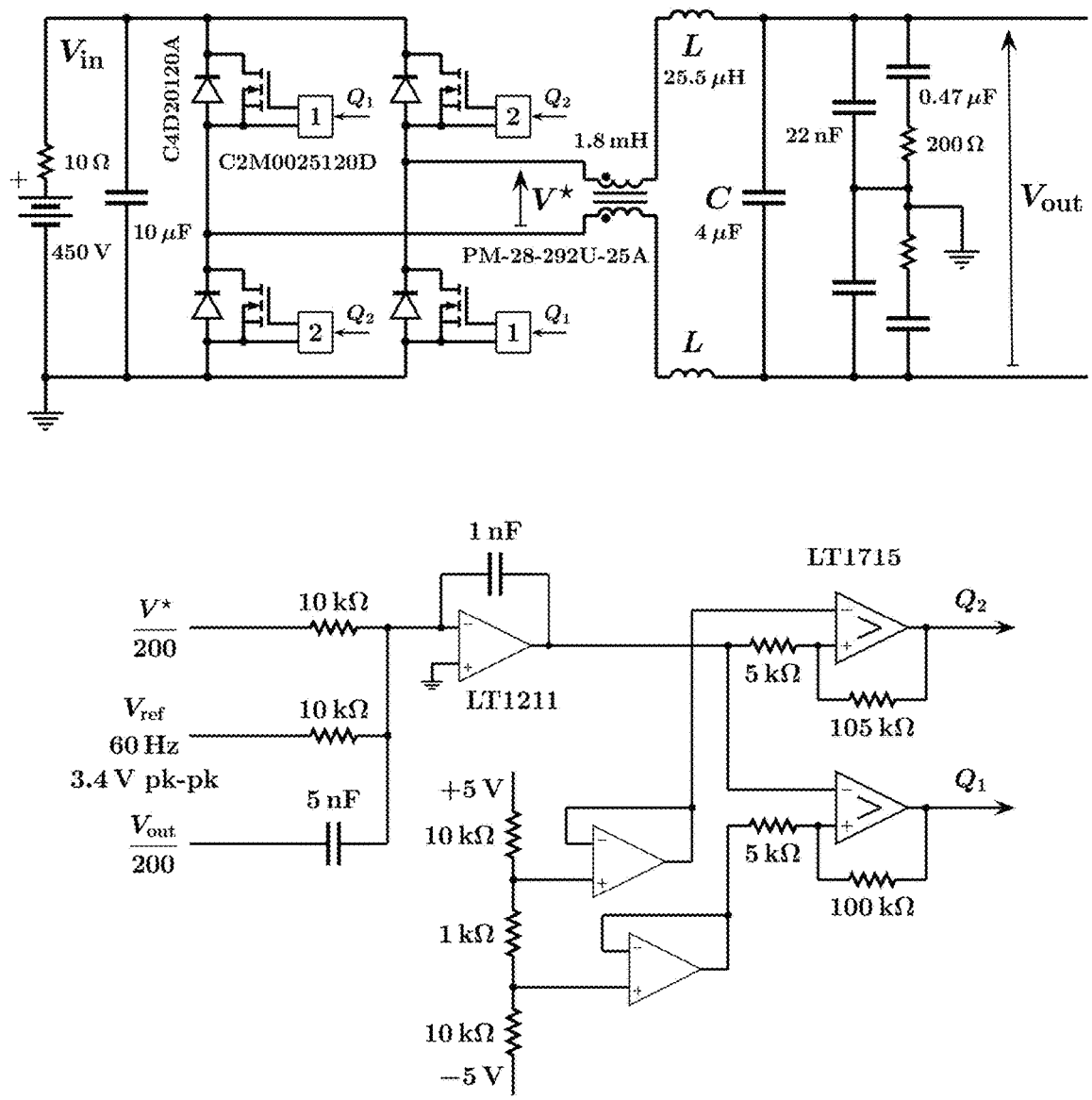
FIG. 12. Illustrative schematic of a particular implementation of a free-running version of the inverter and its associated controller shown in FIG. 1.

2 Free-Running (Variable Frequency) Configuration of an Inverter of the Present Invention FIG. 12 shows an illustrative schematic of a particular implementation of a free-running version of the inverter and its associated controller shown in FIG. 1.

In a free-running configuration, the switching frequency varies with the output voltage, and its average value would depend on the input and output voltages and the load, and would be generally inversely proportional to the value of the hysteresis gap of the Schmitt triggers and the time constant of the integrator.

With the components and the component values shown in FIG. 12, the inverter typically (e.g., in a steady state) operates in a discontinuous conduction mode (DCM) for the output powers ≲2.2 kW, and the modulation type may be viewed as effectively a pulse-frequency modulation.

Figure 13:
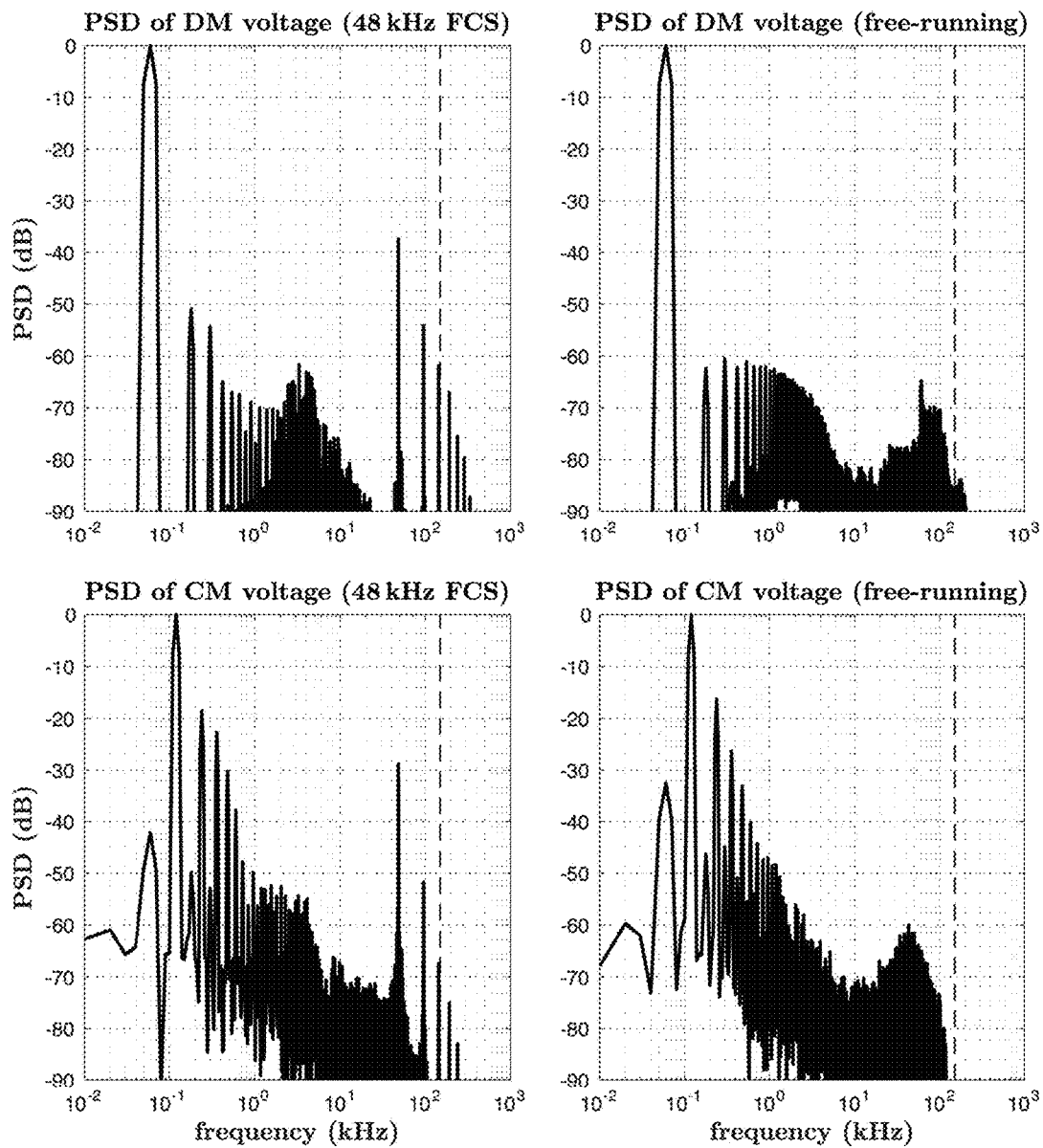
FIG. 13. Power spectra of the common and differential mode output voltages for the particular FCS-based (FIG. 6) and free-running (FIG. 12) implementations. The vertical dashed lines are at 150 kHz.

To illustrate the differences in switching behavior, FIG. 13 shows the power spectra of the common (CM) and differential mode (DM) output voltages for the particular FCS-based (FIG. 6) and free-running (FIG. 12) implementations. The vertical dashed lines are at 150 kHz.

Figure 14:
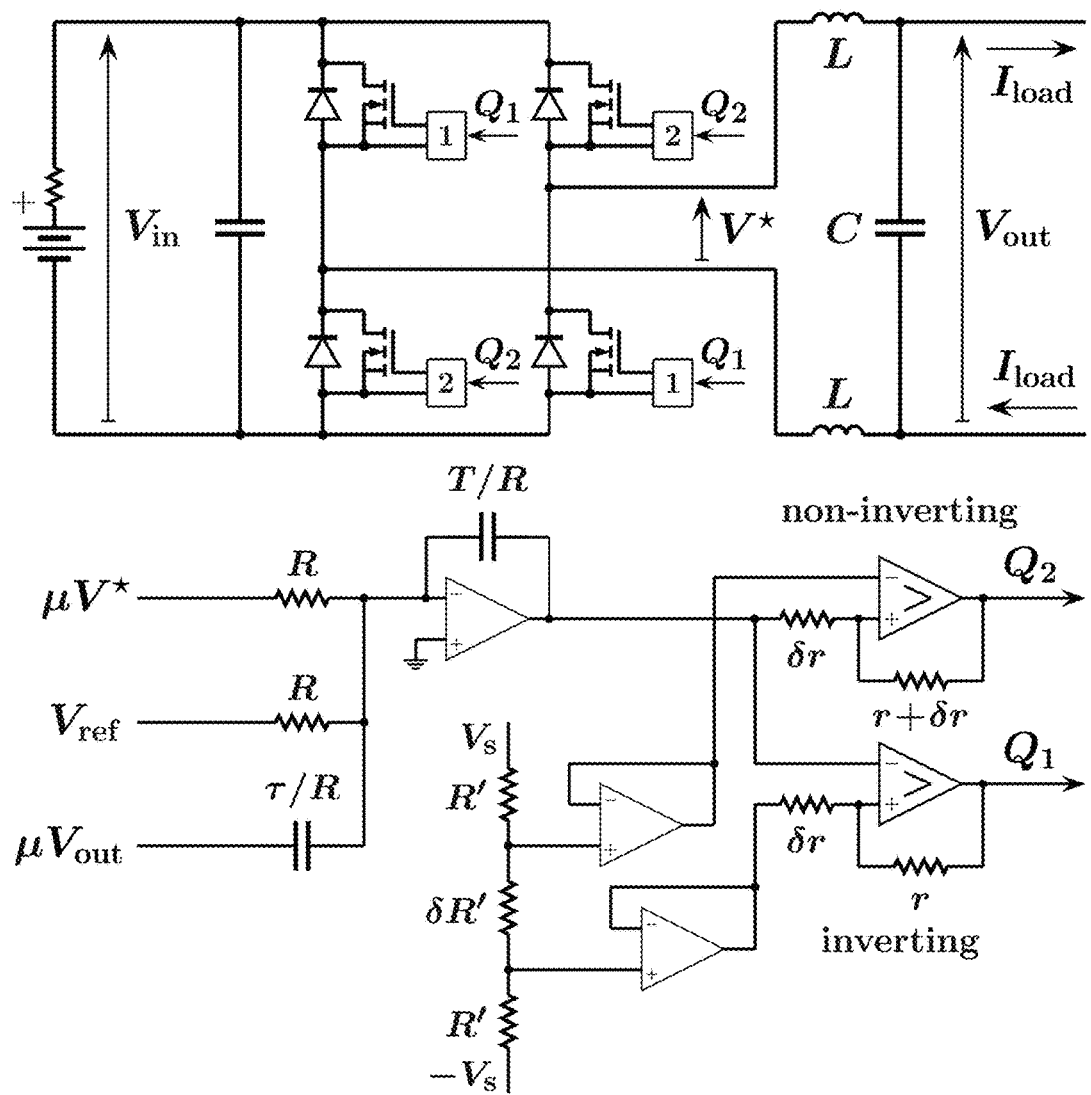
FIG. 14. An H-bridge inverter with a free-running ICM controller.

3 Detailed Description of Basic Operation of an H-Bridge Inverter with a Free-Running ICM Controller FIG. 14 shows a simplified schematic of an H-bridge inverter with a free-running ICM controller. As may be seen in the figure, the MOSFET switches in the bridge are turned on or off by high or low values, respectively, of the switch control signals (SCS) $Q_1$ and $Q_2$ provided by the controller, and the bridge outputs the switching voltage V*. The switching voltage is then filtered with a passive LC filtering network to produce the output voltage $V_{out}$. The ICM controller effectively consists of (i) an integrator (with the time constant T) integrating a sum of three inputs, and (ii) two Schmitt triggers with the same hysteresis gap Δh, inverting (outputting $Q_1$) and non-inverting (outputting $Q_2$). A resistive divider ensures that the reference voltage of the non-inverting Schmitt trigger is slightly higher than that of the inverting one.

For the performance examples in this section that follow, the components and their nominal values are as follows:

The battery electromotive force (e.m.f.) is ϵ=450 V; the battery's internal resistance is 10Ω; the capacitance of the capacitor connected in parallel to the battery is 1,200 μF; the switches are the Cree C2M0025120D SiC MOSFETs; the diodes in parallel to the switches are the Rohm SCS220KGC SiC Schottky diodes; the OpAmps are LT1211; the comparators are LT1715; L=195 μH; C=4 μF; μ=1/200; R=10 kΩ; τ=47 μs (τ/R=4.7 nF); T=22 μs (T/R=2.2 nF); $V_s$=5 V; R'=10 kΩ; δR'=510Ω; r=100 kΩ, and δr=10 kΩ.

Let us initially make a few sensible idealizations, including nearly ideal behavior of the controller circuit, insignificant voltage drops across the components of the bridge, negligible ohmic voltage drops across the reactive components, and approximately constant L and C. We would also assume a practical choice of T and Δh that would ensure sufficiently high switching frequencies for the switching ripples in the output voltage to be ignored, as they would be adequately filtered by the LC circuit. This would imply that we may consider an instantaneous value of $V_{out}$ within a switching cycle to be effectively equal to the average value of $V_{out}$ over this cycle. With such idealizations, and provided that $|V_{ref}|<\mu|V_{in}|$ at all times, the output voltage $V_{out}$ may be expressed, in reference to FIG. 14, by the following equation:

$$\overline{V}_{out} = \left(-\frac{\overline{V}_{ref}}{\mu} - 2L\overline{\dot{I}}_{load}\right) - \tau\overline{\dot{V}}_{out} - 2LC\overline{\ddot{V}}_{out}, \qquad (1)$$

where $I_{load}$ is the load current, the overdots denote time derivatives, μ is the nominal proportionality constant between the reference and the output voltages, and the overlines denote averaging over a time interval between a pair of rising or falling edges of either $Q_1$ or $Q_2$. Thus, according to equation (1), the output voltage of the inverter shown in FIG. 14 would be equal to the voltage $-\overline{V}_{ref}/\mu - 2L\overline{\dot{I}}_{load}$ filtered with a 2nd order lowpass filter with the undamped natural frequency $\omega_n = 1/\sqrt{2LC}$ and the quality factor $Q=\sqrt{2LC}/\tau$. The reference voltage $V_{ref}$ in equation (1) may be an internal reference (e.g. for operating in an islanded mode), or an external reference (e.g. it may be proportional to the mains voltage for synchronization with the grid).

3.1 Derivation of Equation (1)

Let us show how equation (1) may be derived by mapping the voltage and current relations in the output LC filter to the voltage relations among the inputs and the output of the integrator in the ICM controller.

Indeed, for a continuous function $f(t)$, the time derivative of its average over a time interval $\Delta T$ may be expressed as $$\dot{\bar{f}}(t) = \frac{d}{dt}\left[\frac{1}{\Delta T}\int_{t-\Delta T}^{t} ds f(s)\right] = \frac{1}{\Delta T}[f(t) - f(t - \Delta T)], \quad (2)$$

and it will be zero if $f(t) - f(t - \Delta T) = 0$.

Note that rising and falling edges of an output of a Schmitt trigger happen when its input crosses (effectively constant) respective thresholds. Thus relating the inputs and the output of the integrator in the ICM controller, differentiating both sides, then averaging between a pair of rising or falling edges of either $Q_1$ or $Q_2$, would lead to $$\bar{V}^* = -\frac{V_{ref}}{\mu} - \tau \dot{\bar{V}}_{out}. \quad (3)$$

On the other hand, from the voltage and current relations in the output LC filter, $$\bar{V}^* = \bar{V}_{out} + 2L\dot{\bar{I}}_{load} + 2LC\ddot{\bar{V}}_{out} \quad (4)$$

and equating the right-hand sides of (3) and (4) would lead to equation (1).

3.2 Transient Responses

For convenience, we may define the "no-load ideal output voltage" $V_{ideal}$ as $$V_{ideal} = -\frac{V_{ref}}{\mu} - \tau \dot{V}_{ideal} - 2LC\ddot{V}_{ideal}. \quad (5)$$

Then equation (1) may be rewritten as $$\bar{v} = -\frac{2\mu L}{V_0}\dot{\bar{i}}_{load} - \tau \dot{\bar{v}} - 2LC\ddot{\bar{v}}, \quad (6)$$

where v is a nondimensionalized error voltage that may be defined as the difference between the actual and the ideal outputs in relation to the magnitude of the ideal output, for example, as $$v = \frac{V_{out} - V_{ideal}}{\max|V_{ideal}|}, \quad (7)$$

where max $|V_{ideal}|$ is the amplitude of the ideal output. For a sinusoidal reference $V_{ref} = V_0 \sin(2\pi f_{AC} t)$, and provided that $Q \lesssim 1$ and $\tau f_{AC} \lll 1$, the no-load ideal output would be different from $-V_{ref}/\mu$ by only a relatively small time delay and a negligible change in the amplitude. Then v may be expressed as $v = \mu(V_{out} - V_{ideal})/V_0$.

Note that the symbol $\lesssim$ may be read as "smaller than or similar to", and the symbol $\lll$ may be understood as "two orders or more smaller than".

Thus, according to equation (6), the transients in the output voltage (in addition to the "normal" switching ripples at constant load) would be proportional to the time derivative of the load current filtered with a 2nd order lowpass filter with the undamped natural frequency $\omega_n = 1/\sqrt{2LC}$ and the quality factor $Q = \sqrt{2LC}/\tau$. Note that the magnitude of these transients would also be proportional to the output filter inductance L.

For example, for a step change at time $t = t_0$ in the conductance G of an ohmic load, from $G = G_1$ to $G = G_2$, equation (6) would become $$\bar{v} = -\frac{2\mu L V_{out}(t_0)}{V_0}(G_2 - G_1)\overline{\delta(t - t_0)} - \quad (8)$$

$$\{\tau + 2L[G_1\overline{\theta(t_0 - t)} + G_2\overline{\theta(t - t_0)}]\}\dot{\bar{v}} - 2LC\ddot{\bar{v}},$$

where $\theta(x)$ is the Heaviside unit step function [2] and $\delta(x)$ is the Dirac $\delta$-function [3]. In equation (8), the first term is the impulse disturbance due to the step change in the load current, and $V_{out}(t_0)$ is the output voltage at $t = t_0$. Note that $\overline{\delta(t-t_0)}$ would be zero if $t_0$ lies outside of the averaging interval $\Delta T$, and would be equal to $1/\Delta T$ otherwise.

Note that formally $\overline{\delta(t-t_0)} = 1/(2\Delta T)$ when $t_0$ is exactly at the beginning or at the end of the averaging interval.

Figure 15:
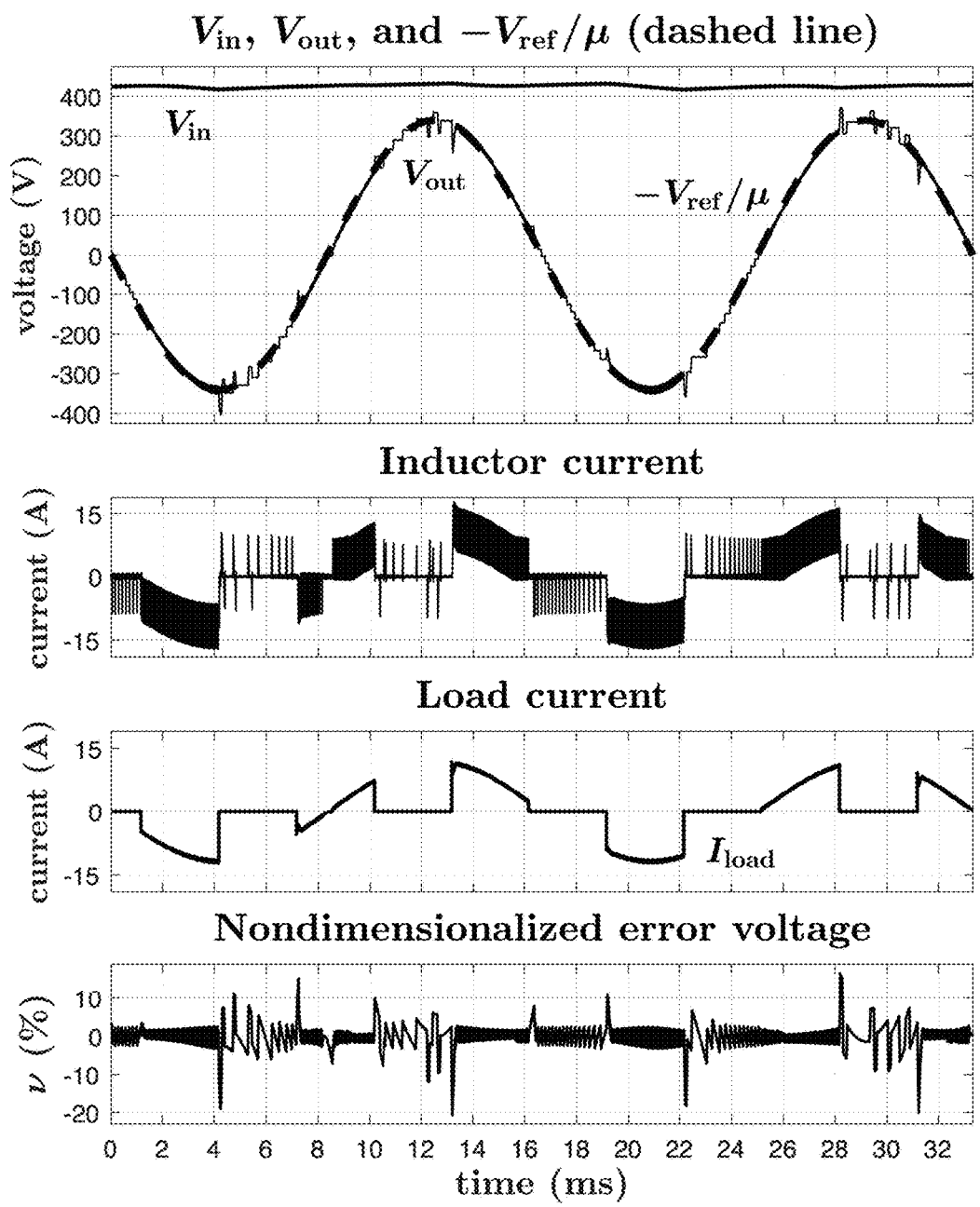
FIG. 15. Example of full-range transient waveforms for ohmic load.

FIG. 15 provides an example of illustrative transient voltage and current waveforms for a particular implementation of the inverter and its associated ICM controller shown in FIG. 14, in response to full-range step changes in a resistive load. Note that the switching interval, as well as the inductor current and its operation mode (e.g. continuous (CCM) or discontinuous (DCM)) change according to the output voltage values and the load conditions, and would also change according to the power factor of the load.

Figure 16:
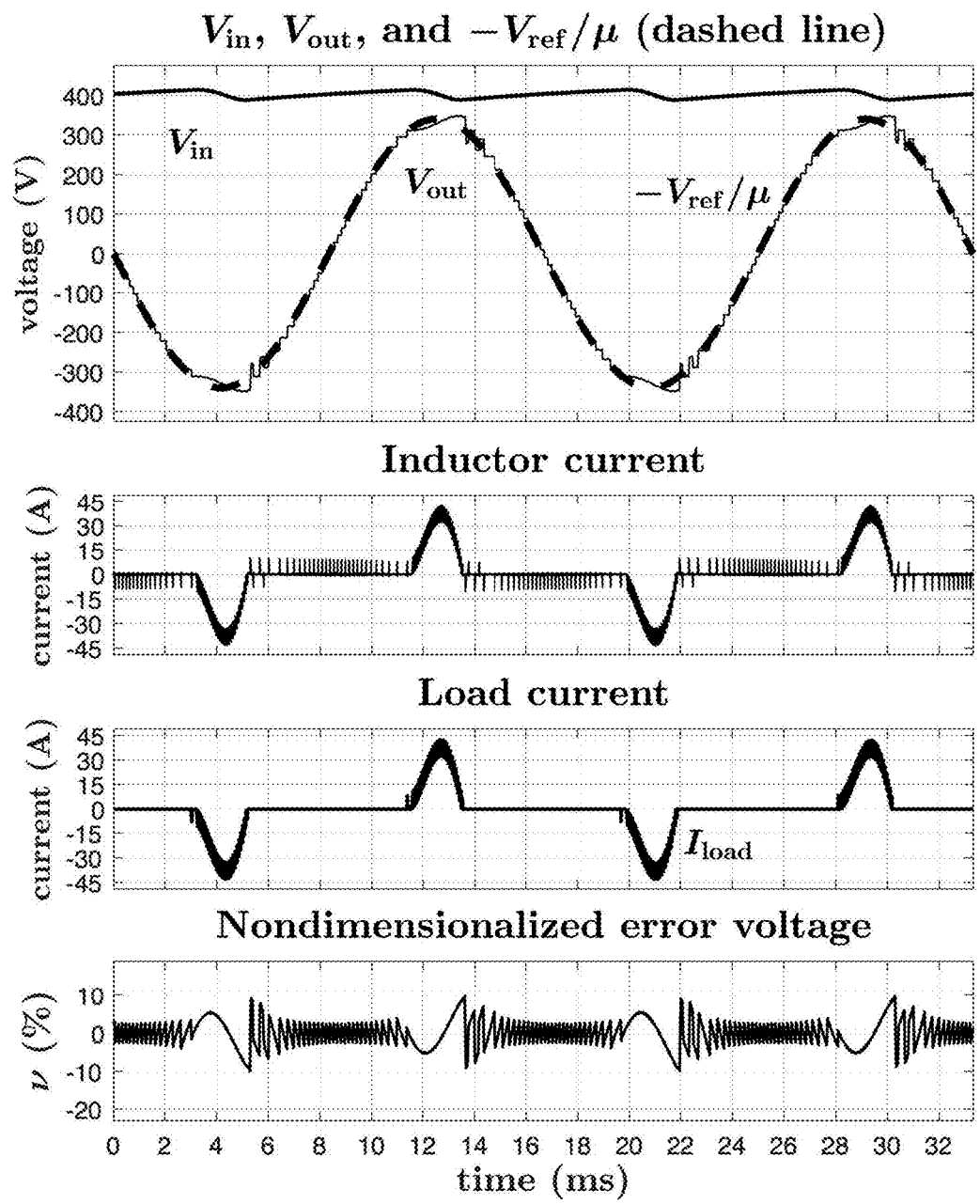
FIG. 16. Transient waveforms for nonlinear (full-wave diode rectifier) load (2 kW).

It is also instructive to illustrate the robustness and stability of this inverter for other highly nonlinear loads. (A nonlinear electrical load is a load where the wave shape of the steady-state current does not follow the wave shape of the applied voltage (i.e. impedance changes with the applied voltage and Ohm's law is not applicable)). FIG. 16 provides an example of voltage and current waveforms when the inverter with its associated ICM controller shown in FIG. 14 is connected to a full-wave diode rectifier powering a 2 kW load.

Figure 17:
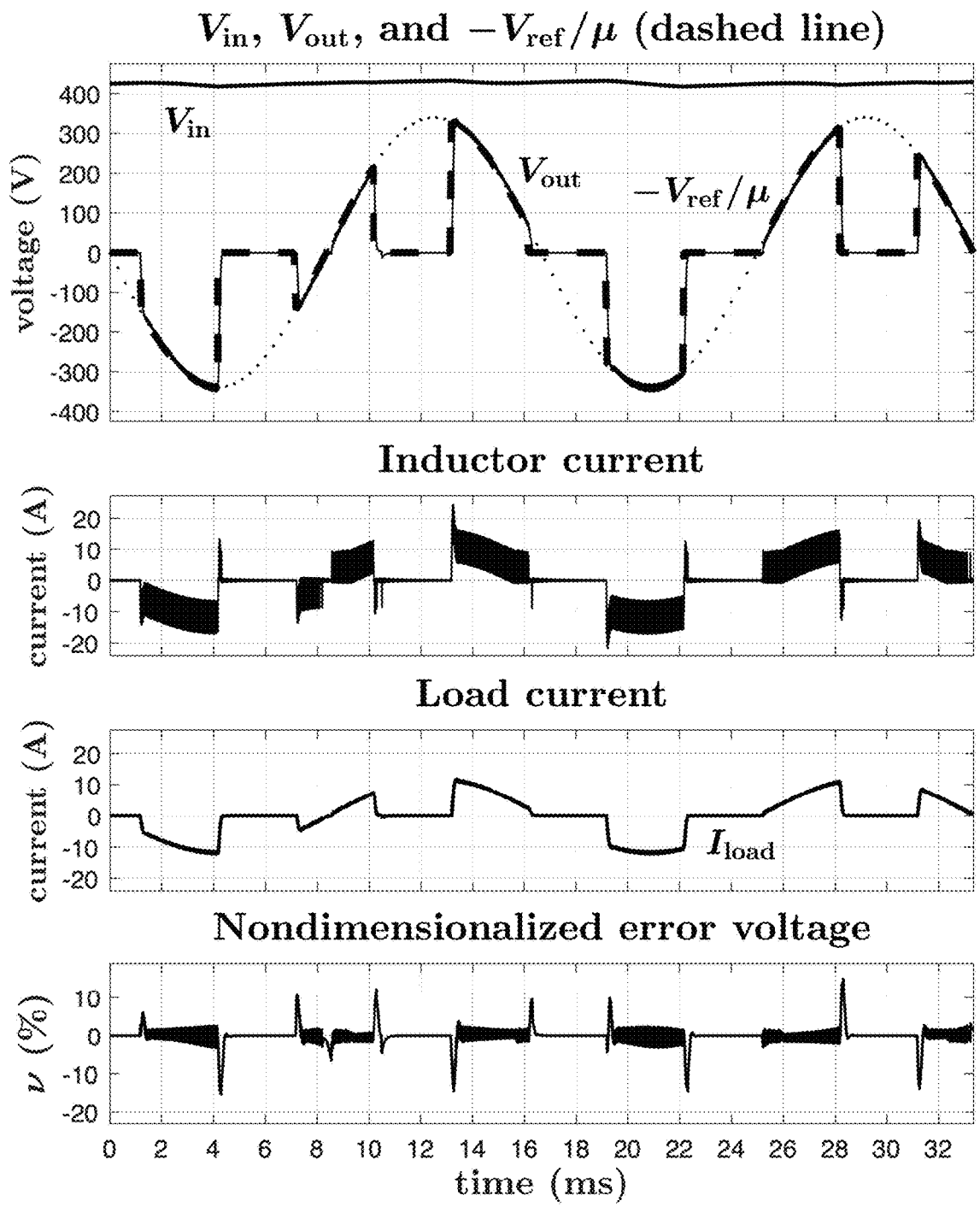
FIG. 17. Transient waveforms for changes in $V_{ref}$ ("instantaneous" synchronization with reference).
Figure 18:
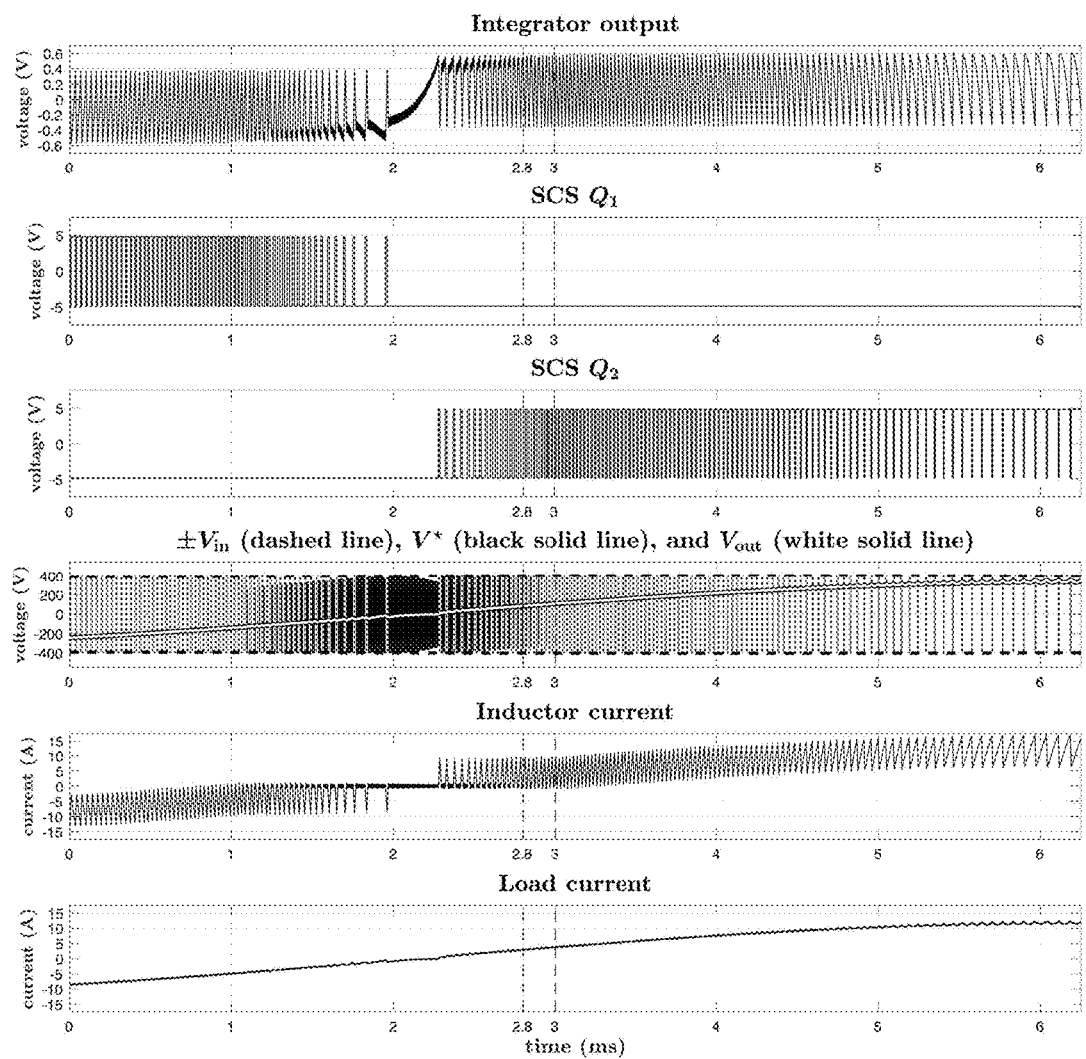
FIG. 18. Illustrative steady state waveforms at full (2 kW) resistive load.
Figure 19:
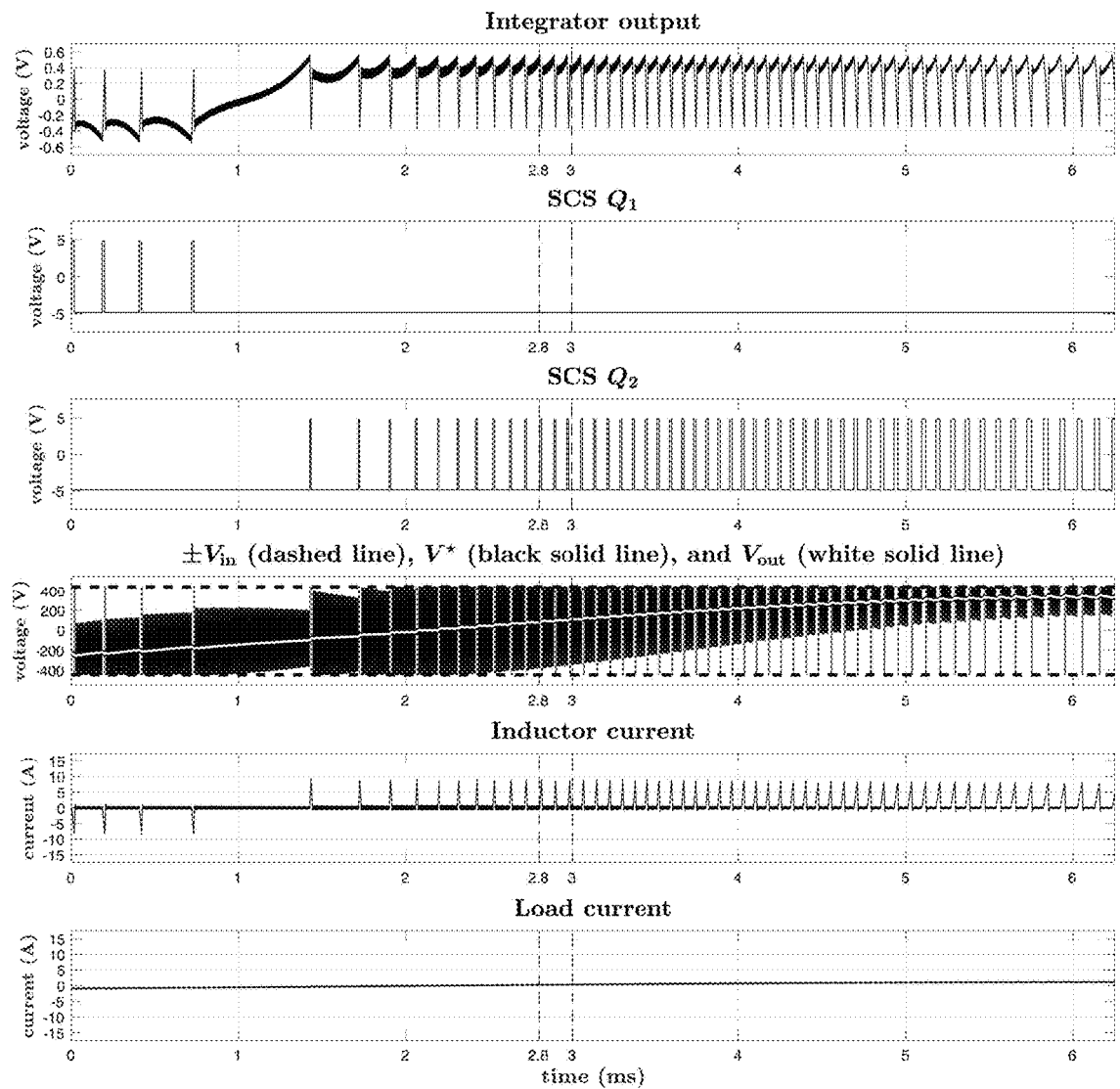
FIG. 19. Illustrative steady state waveforms at 10% (200 W) resistive load.
Figure 20:
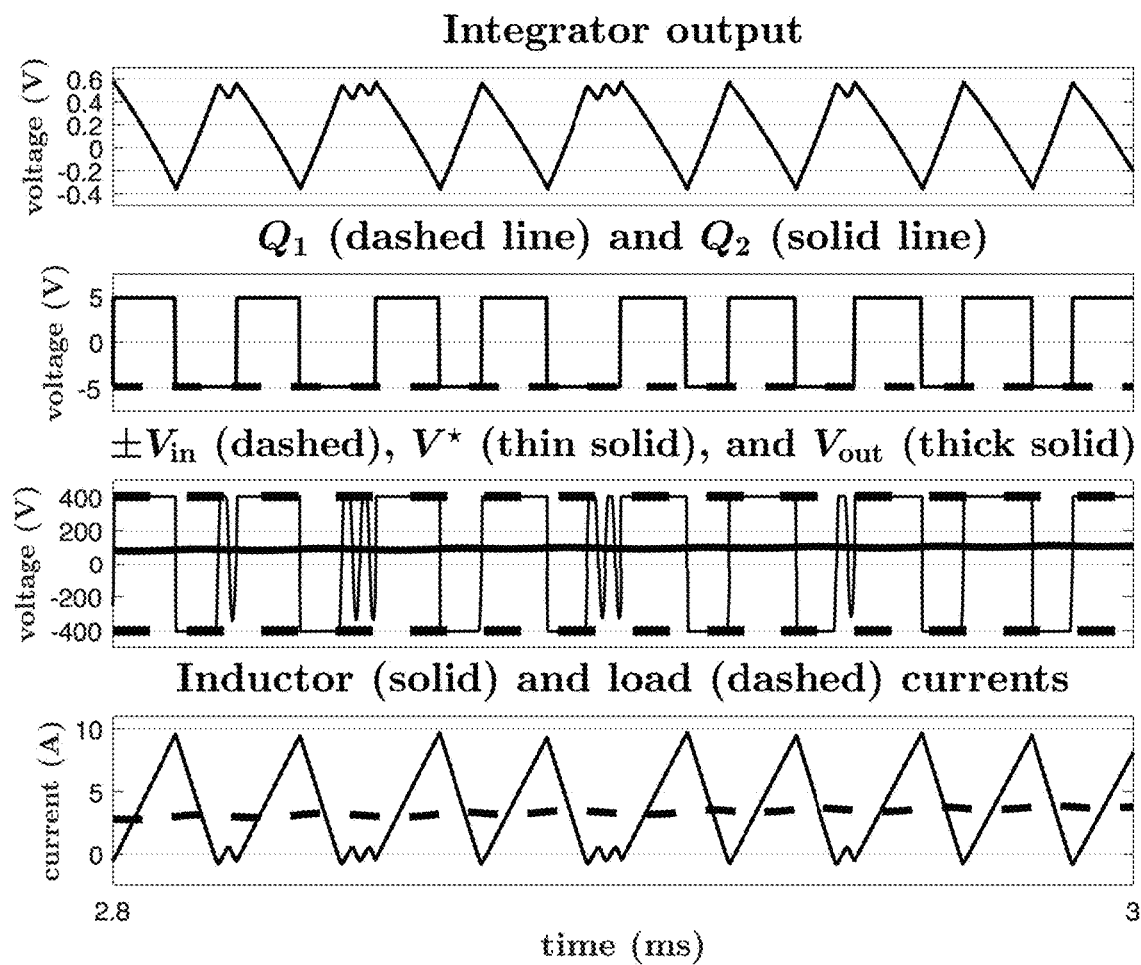
FIG. 20. Full-load (2 kW) waveforms on 2.8 ms to 3 ms interval.
Figure 21:
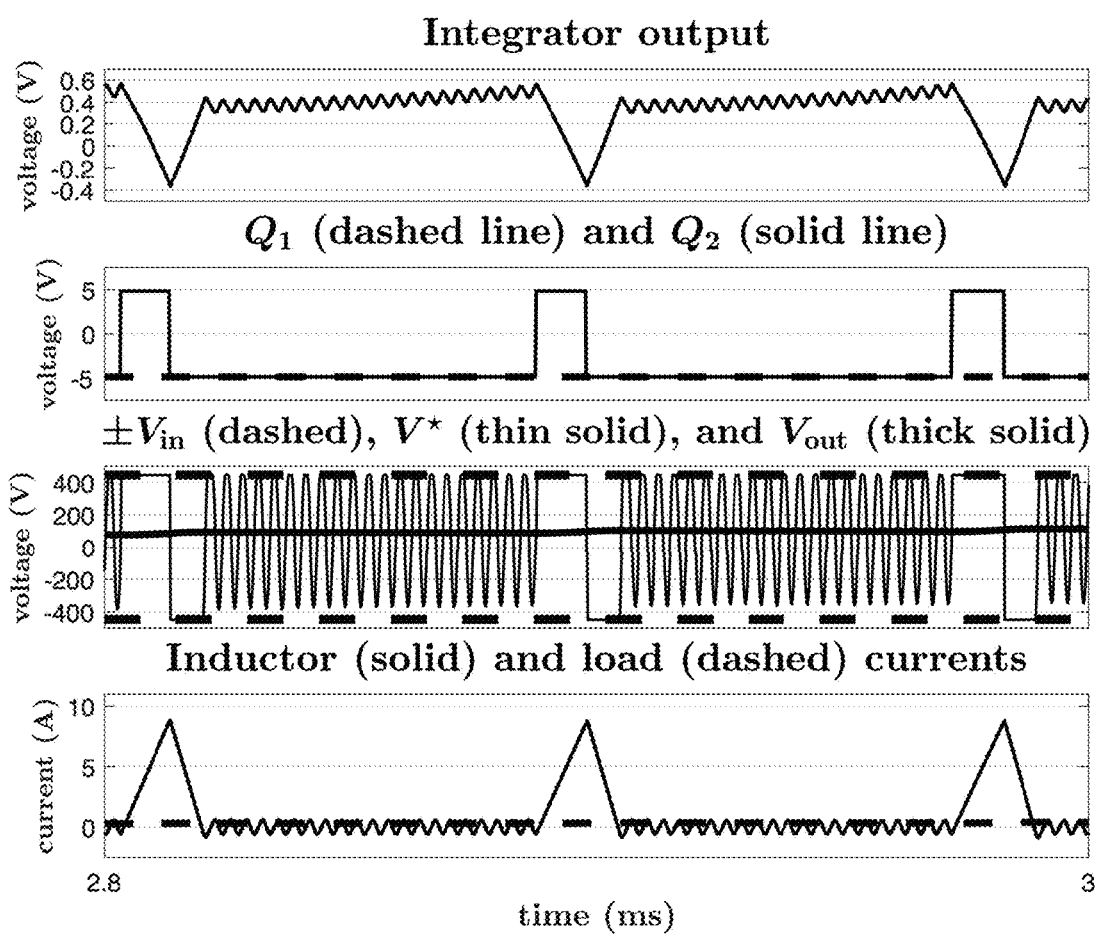
FIG. 21. 10%-load (200 W) waveforms on 2.8 ms to 3 ms interval.

FIG. 17 provides an example of transient voltage and current waveforms, for the same inverter, in response to connecting and disconnecting the reference voltage. This shows the "instantaneous" synchronization with reference, e.g., illustrating how the presented inverter may quickly disconnect from and/or reconnect to the grid when used as a grid-tie inverter.

3.3 Switching Behavior and Efficiency Optimization

From the above mathematical description one may deduce that, for given inductor and capacitor values, and for given controller parameters (e.g., T and $\Delta h$), the total switching interval (i.e., the time interval between an adjacent pair of rising or falling edges of either $Q_1$ or $Q_2$), the duty cycle, and the "on" and "off" times, would all vary depending on the values and time variations of $V_{in}$, $V_{ref}$, $V_{out}$, and the load current. Thus the switching behavior of the ICM controller may not be characterized in such simple terms as pulse-width or pulse-frequency modulation (PWM or PFM). This is illustrated in FIGS. 18 through 21, which show representative steady state waveforms at full (2 kW), and 10% (200 W) resistive loads.

Figure 22:
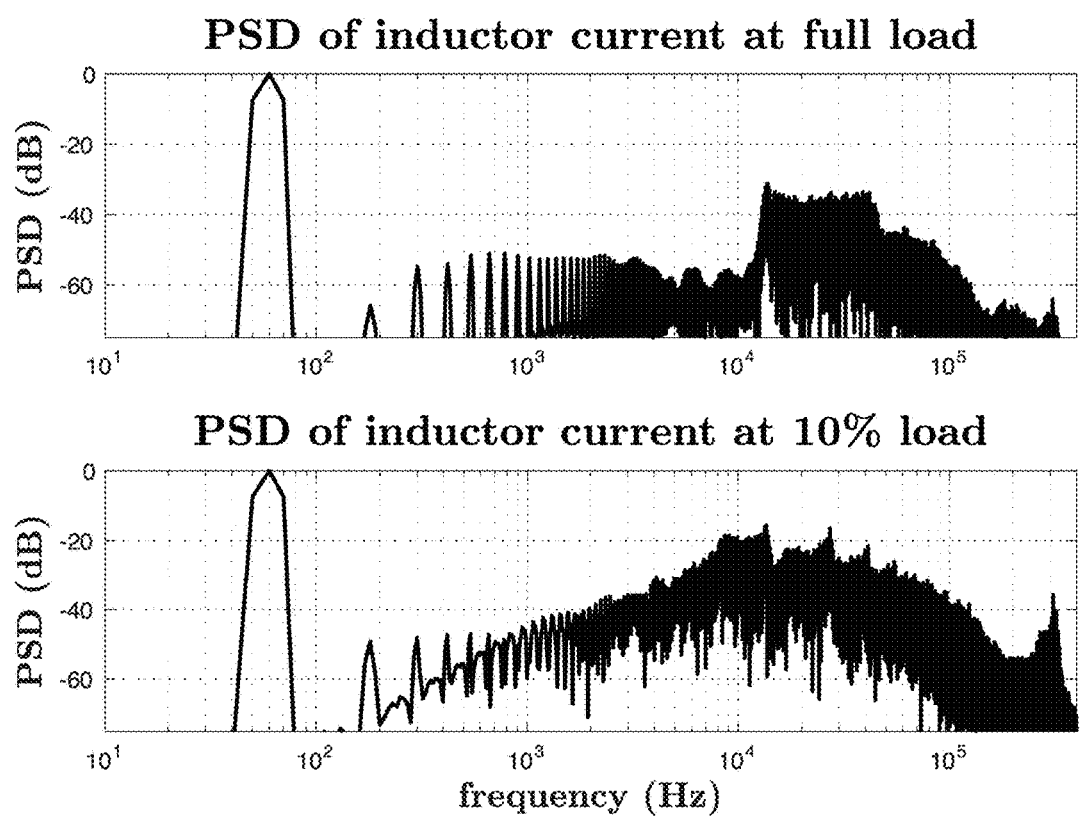
FIG. 22. PSD of inductor current at full and 10% loads.

In a steady state (i.e. for a constant load), the average value of the switching interval would be generally proportional to the product of the integrator time constant T and the hysteresis gap Δh of the Schmitt triggers (i.e. the values of r and δr). The particular value of the switching interval would also depend on the absolute value of the reference voltage $|V_{ref}|$ (as $\propto |V_{ref}|^{-1}$), on the ratio $|V_{ref}|/|V_{in}|$, and on the load current [4, 5]. As a result, even in a steady state, for a sinusoidal AC reference the switching frequency would span a continuous range of values, as illustrated in FIG. 22, which shows the power spectral density (PSD) of the inductor current at full (2 kW) and 10% (200 W) resistive loads.

For given inverter components and their values, the power losses in various components would be different nonlinear functions of the load, and would also exhibit different nonlinear dependences on the integrator time constant T and the hysteresis gap Δh. Thus, given a particular choice of the MOSFET switches and their drivers, the magnetics, and other passive inverter components, by adjusting T and/or Δh one may achieve the best overall compromise among various component power losses (e.g., between the bridge and the inductor losses), while remaining within other constraints on the inverter specifications.

Figure 23:
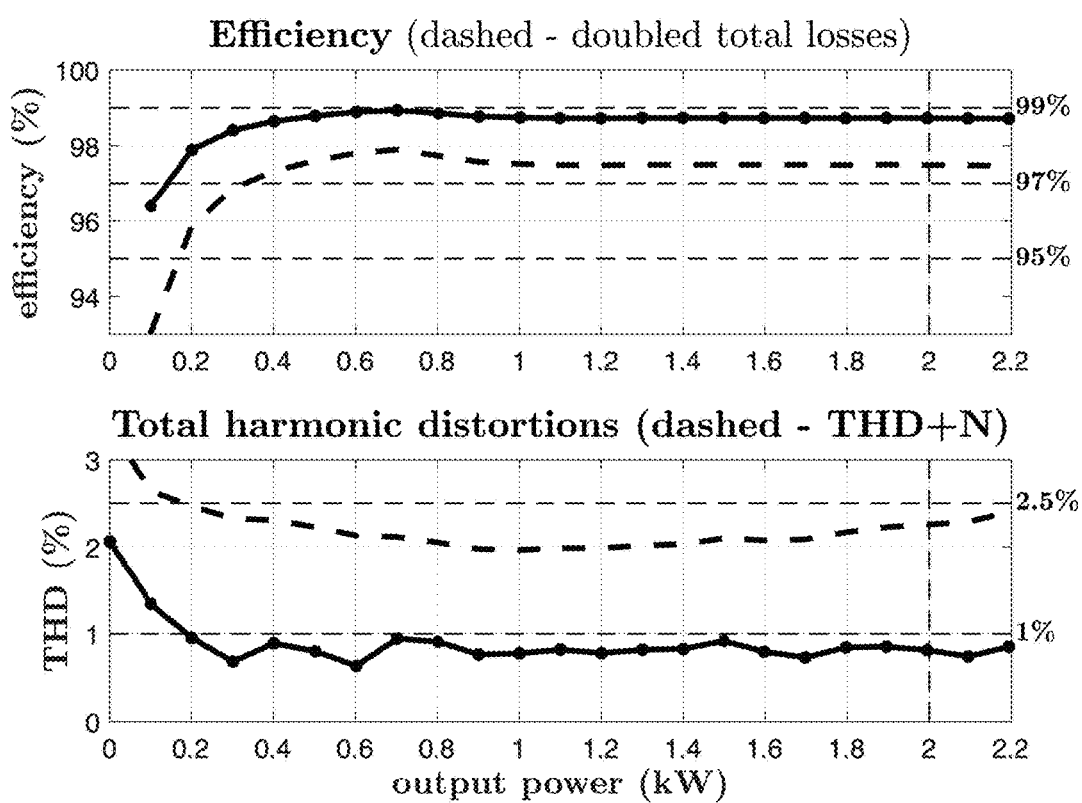
FIG. 23. Efficiency and THD as functions of output power.

FIG. 23 provides an example of simulated efficiency and total harmonic distortion (THD) values as functions of the output power for a particular inverter implementation using commercial off-the-shelf (COTS) components (including SiC MOSFETs and diodes), with the specifications according to the technical requirements for the Little Box Challenge [6] outlined in [7]. In the efficiency simulations, high-fidelity models were used for the MOSFETs and diodes, and the inductor core and winding losses were taken into account. The dashed line in the upper panel of FIG. 23 plots the simulated efficiency with more conservative (doubled) estimated total losses, including the MOSFET and the inductor losses.

3.4 Startup Behavior

Figure 24:
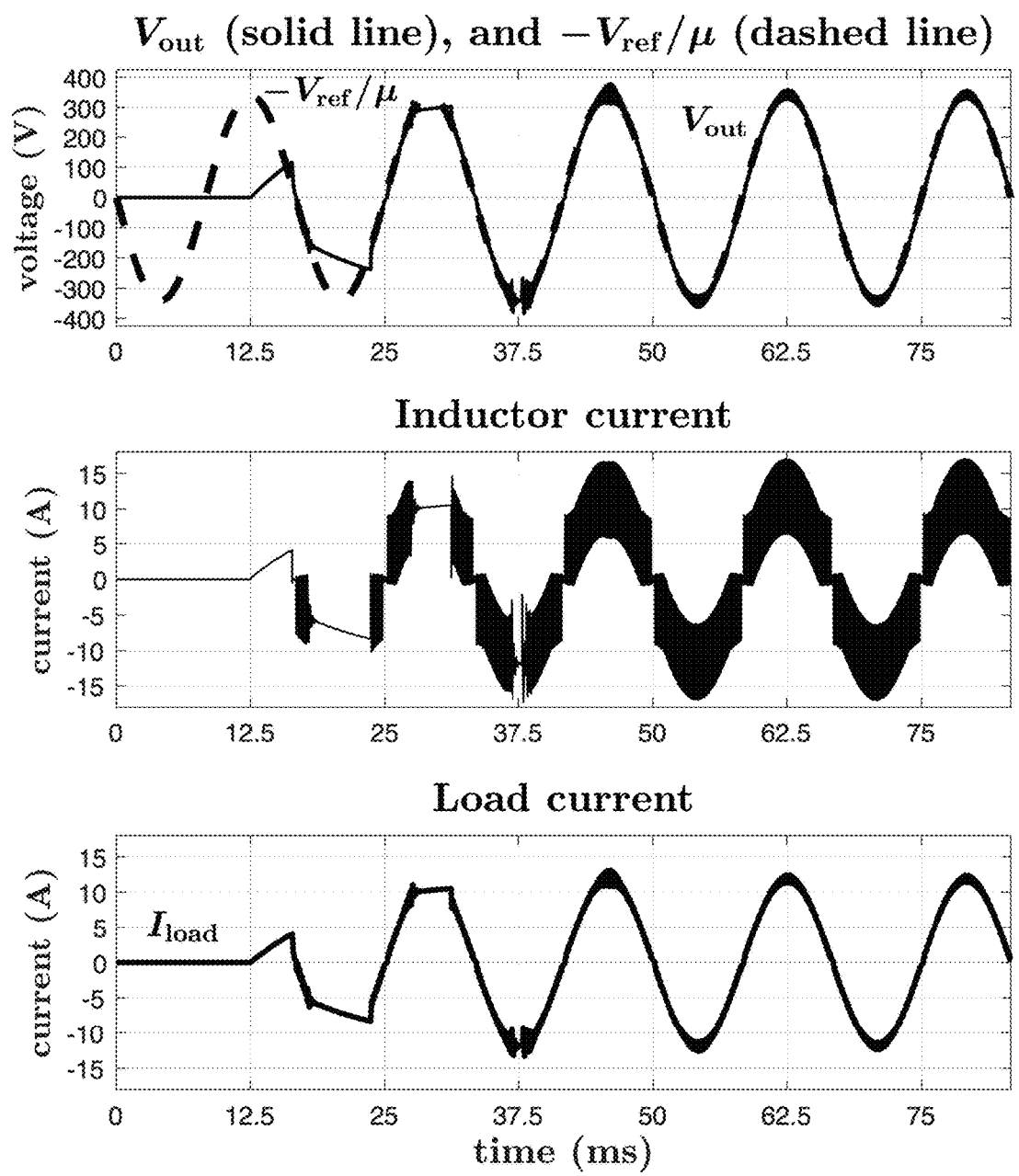
FIG. 24. Illustrative startup voltages and currents.

FIG. 24 illustrates the startup voltages (upper panel) and currents (lower panel) for a full (2 kW) resistive load connected to the output of the inverter. As one may see, as long as the controller is powered up, the battery may be connected to the input of the inverter (at 12.5 ms in the figure), and the output voltage would quickly converge to the desired output without excessive inrush currents and/or voltage transients. The only significant inrush current may be the initial current through the battery, charging the inverter's input capacitor during the time interval comparable with the product of the input capacitor and the battery's internal resistance.

Figure 25:
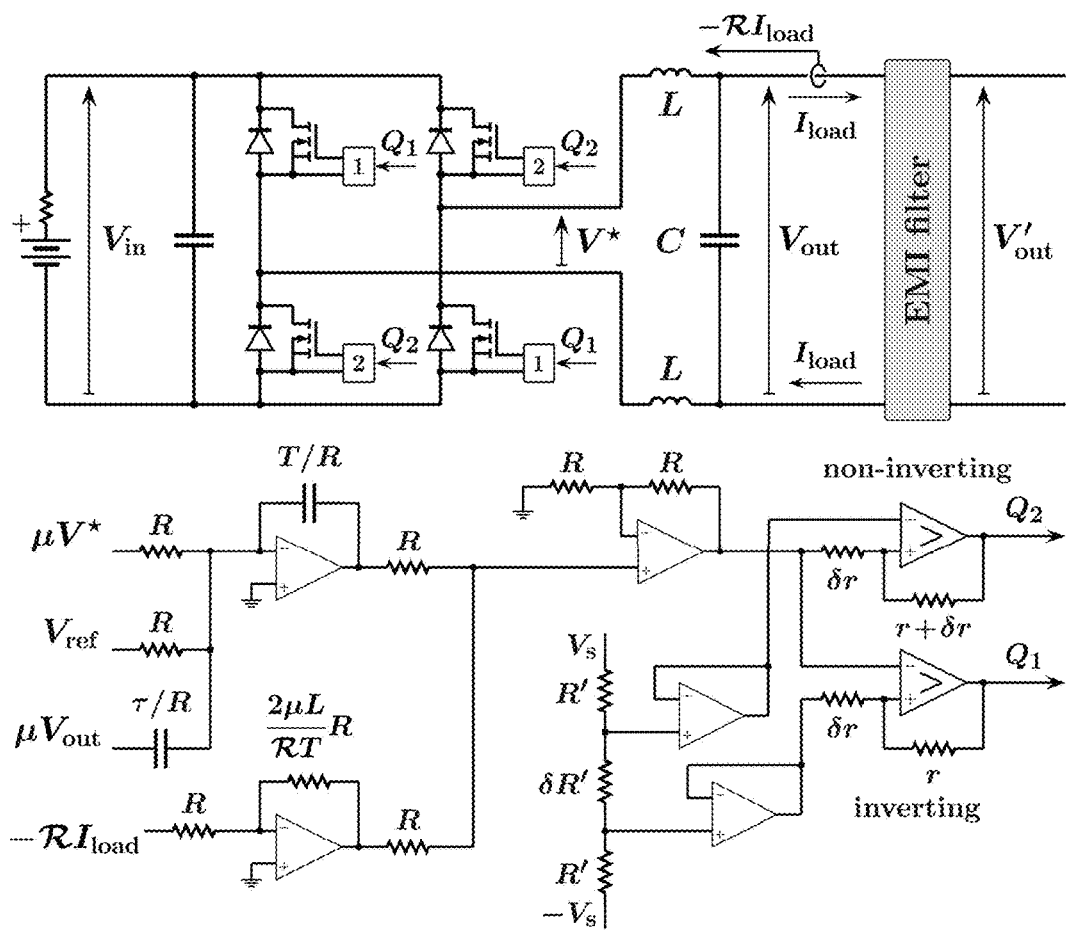
FIG. 25. Inverter and ICM controller with load current feedback.

3.5 Improving Transient Response by Introducing Feedback of the Load Current One may infer from equation (1) that the term $-2L\dot{I}_{load}$ may be cancelled by adding $-2\mu L \dot{I}_{load}$ to the input of the integrator. However, the switching ripples in the load current would normally make such an approach impractical. Instead, one should add a voltage $2\mu L I_{load}/T$ directly to the inputs of the Schmitt triggers, as illustrated in FIG. 25.

Figure 26:
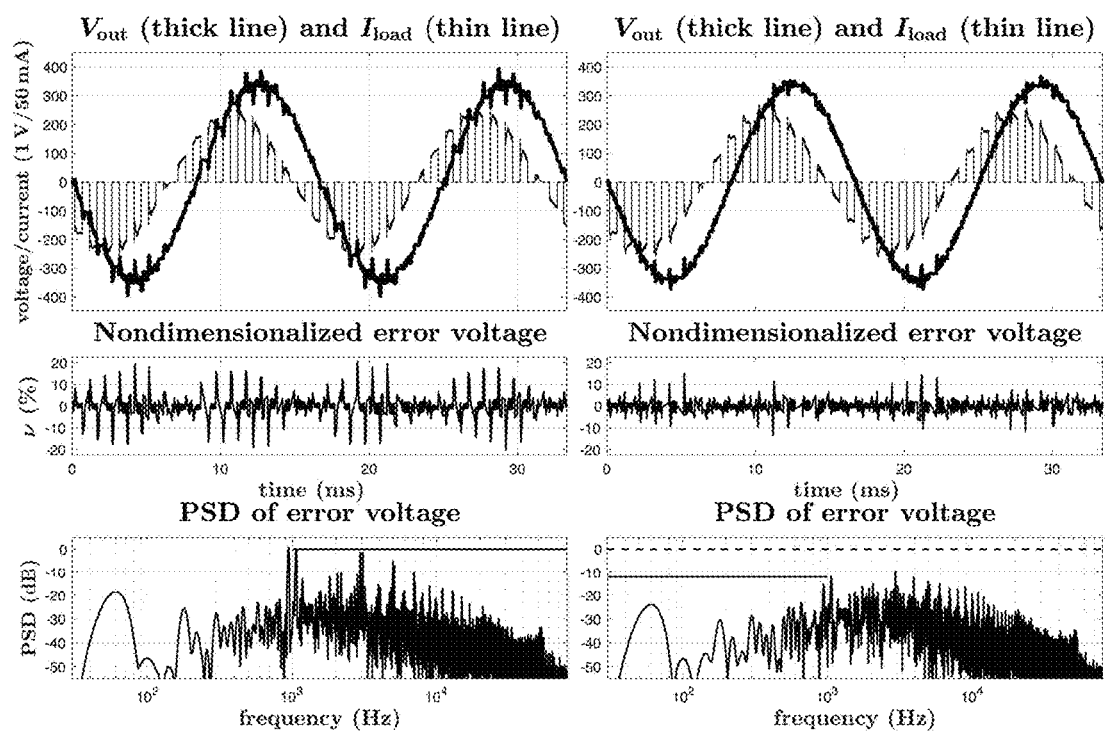
FIG. 26. Transient responses for leading PF=0.5 load without (left) and with (right) current feedback.

Additionally, because of the propagation delays and other circuit nonidealities, fast step current transients may not be cancelled exactly. Instead, the current feedback would try to "counteract" an impulse disturbance in the output voltage due to a step change in the load current by a closely following pulse of opposite polarity, mainly reducing the frequency content of the transients that lies below the switching frequencies. This is illustrated in FIG. 26, which compares the transient responses for an ICM controller without (left) and with (right) current feedback, when a leading PF=0.5 load is connected to and disconnected from the output of the inverter with the frequency 1 kHz and 50% duty cycle. As indicated by the horizontal lines in the lower panels of the example of FIG. 26, the current feedback reduces the PSD of the transients at the load switching frequency (1 kHz) by approximately 12 dB.

4 Buck-Boost DC/DC Converter with ICM Controller

While above the ICM controller is disclosed in connection with a hard switching H-bridge power inverter, the ICM concept may be extended, with proper modifications, to other hard- or soft-switching power inverter and DC/DC converter topologies.

Figure 27:
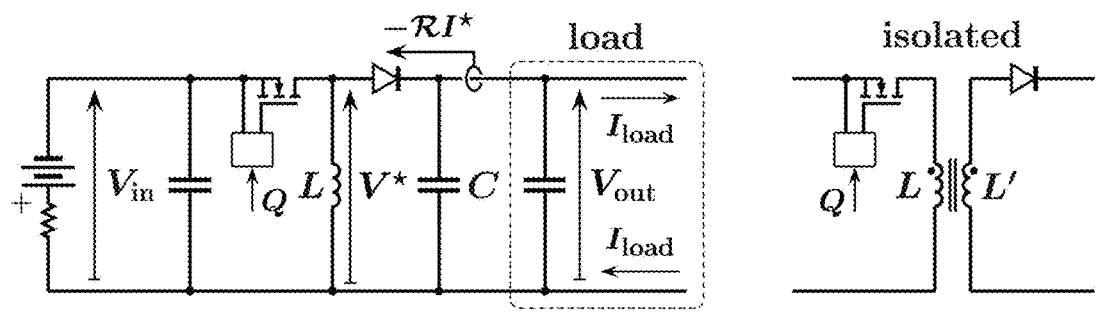
FIG. 27. Buck-boost DC/DC converter with ICM controller.
Figure 27:
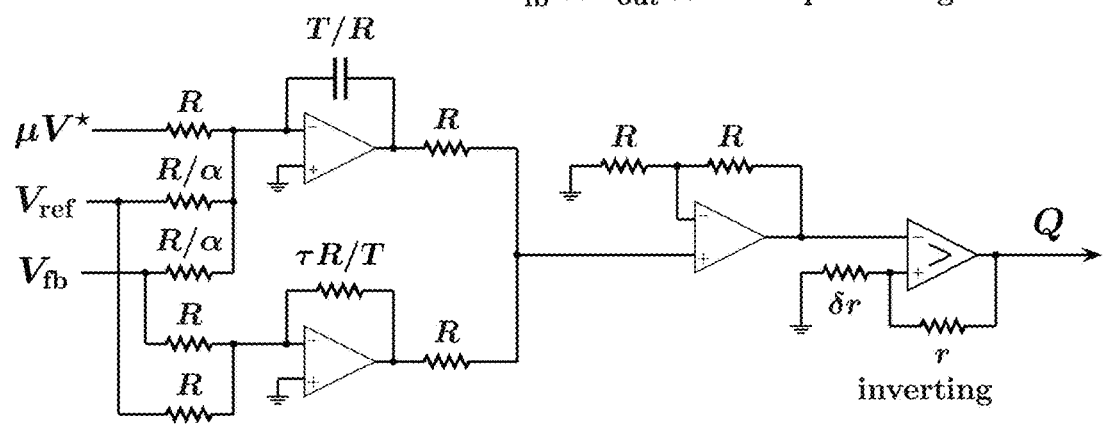

As an illustration, FIG. 27 provides an example of a buck-boost DC/DC converter with an ICM controller. When the feedback voltage $V_{fb}$ is proportional to the output voltage, $V_{fb}=-V_{out}/\beta$, this converter would provide an output voltage regulation with the nominal steady-state output voltage $\beta V_{ref}$. When the feedback voltage $V_{fb}$ is proportional to the load current, $V_{fb}=-\mathcal{R} I^*/\beta$, this converter would provide an output current regulation with the nominal steady-state output current $\beta V_{ref}/\mathcal{R}$. Note that in this example the load explicitly contains a (parallel) capacitance that may be comparable with, or larger than, the converter capacitance C, and thus the feedback voltage may contain very strong high-frequency components. Further, when the feedback voltage $V_{fb}$ is proportional to the output power, $V_{fb}=-V_{out}I^*/I_0/\beta$, this converter would provide an output power regulation with the nominal steady-state output power $\beta V_{ref}I_0$.

Figure 28:
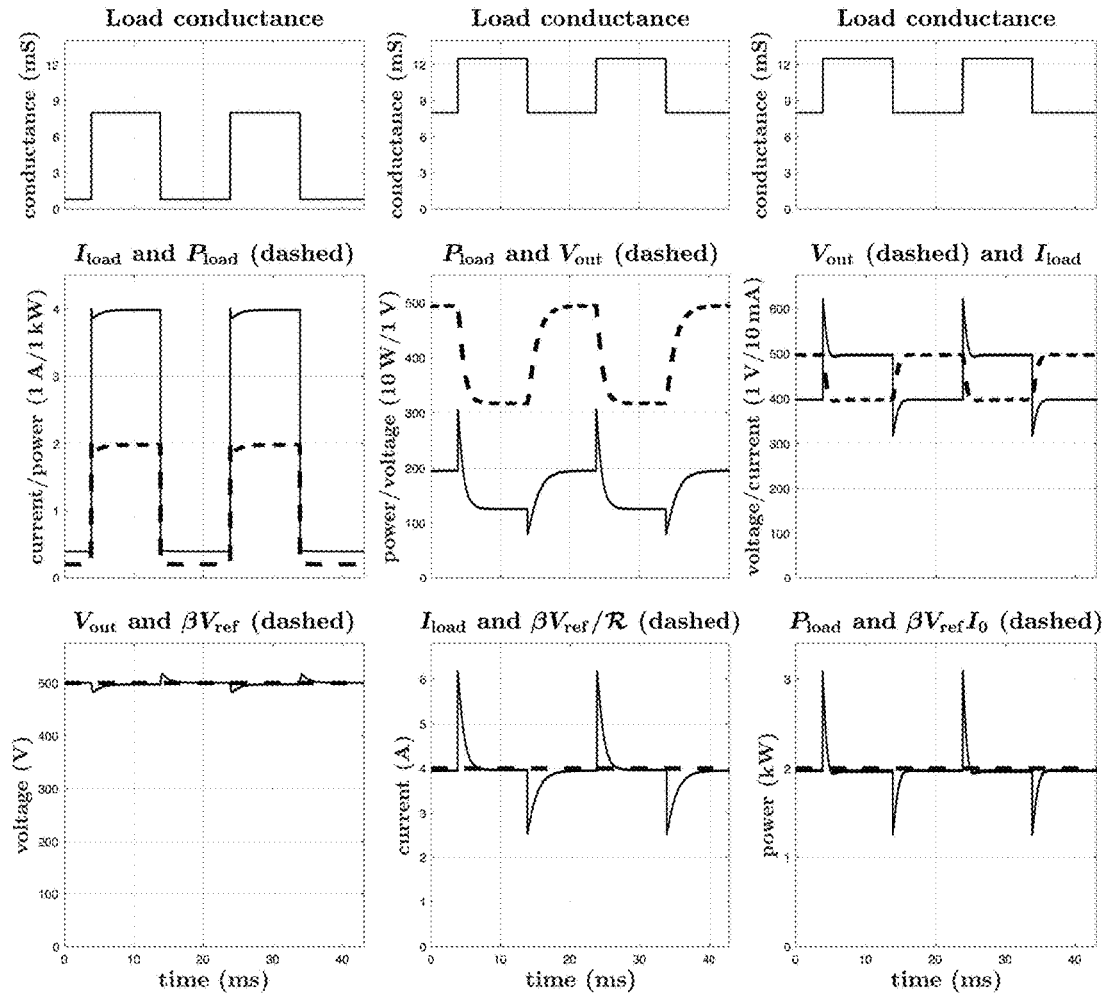
FIG. 28. Example of transient waveforms for the converter shown in FIG. 27 configured for voltage, current, and power regulation.

FIG. 28 provides an example of transient waveforms for a particular implementation of the converter shown in FIG. 27 configured for voltage, current, and power regulation.

For an isolated version, the converter inductor may be replaced by a flyback transformer, as indicated in the upper right corner of FIG. 27.

4.1 Startup Sequence for the Buck-Boost DC/DC Converter with ICM Controller

For a proper startup of the converter shown in FIG. 27, the initial value of the reference voltage $V_{ref}$ should be zero. After both the controller circuit and the power stage are powered up, the reference voltage should be ramped up from zero to the desired value over some time interval. The duration of this time interval would depend on the converter specifications and the component values, and would typically be in the 1 ms to 100 ms range.

Figure 29:
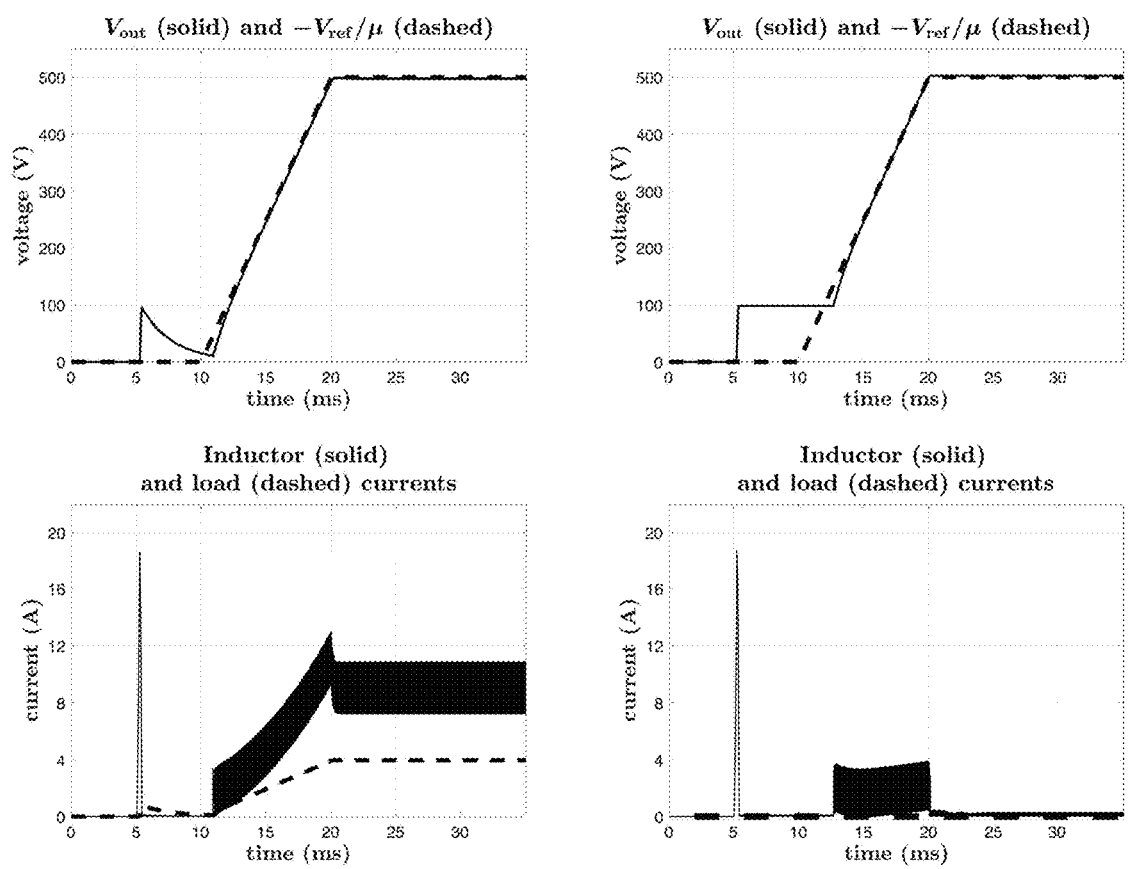
FIG. 29. Startup voltages and currents for the buck-boost DC/DC converter with ICM controller.

For a particular implementation of the converter, FIG. 29 illustrates the startup voltages and currents for a full resistive load connected to the output of the converter (upper panel), and for no load at the output (lower panel). In this illustration, the controller circuit is powered up first, with the reference voltage set to zero. At 5 ms, the battery is connected to the converter input. At 10 ms, the reference voltage starts ramping up from zero, reaching its desired value at 20 ms. As one may see, with such a startup sequence there would be no excessively high inrush currents through the converter inductor.

5 ICM Control of 3-Phase Inverters

Figure 30:
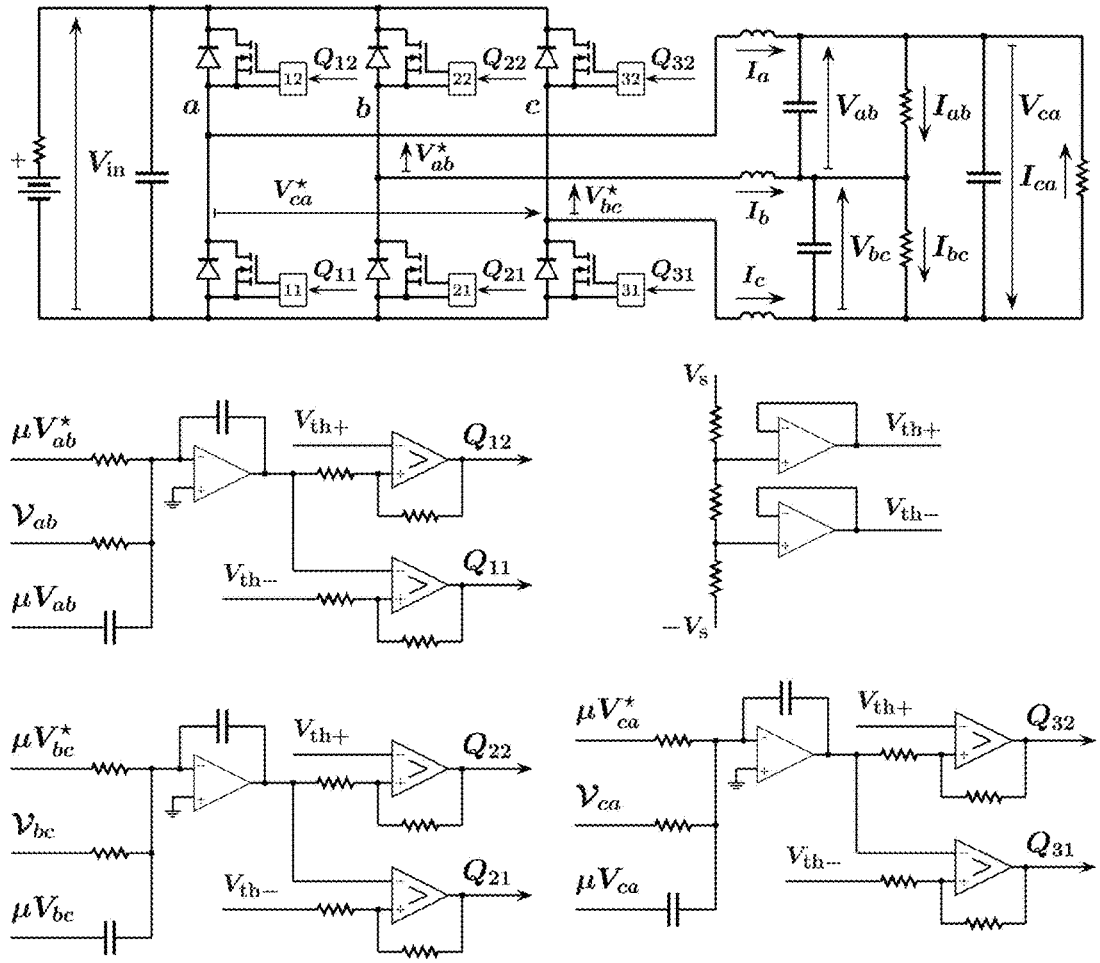
FIG. 30. Illustrative example of an ICM-controlled 3-phase inverter.

FIG. 30 provides an example of an ICM-controlled 3-phase inverter. Here, the output line-to-line voltages $V_{ab}$, $V_{bc}$, and $V_{ca}$ would be proportional to the respective reference voltages $v_{ab}$, $v_{bc}$, and $v_{ca}$, where $v_{ab}+v_{bc}+v_{ca}=0$. Note that, in general, the reference voltages do not need to be sinusoidal signals.

As one should be able to see in FIG. 30, the switches in the bridge are controlled by three instances of an ICM controller disclosed herein, and each leg of the bridge is separately controlled by its respective ICM controller.

The switching voltages $V_{ab}^*$, $V_{bc}^*$, and $V_{ca}^*$ are the differences between the voltages at nodes a, b, and c: $V_{ab}^*=V_a^*-V_b^*$, $V_{bc}^*=V_b^*-V_c^*$, and $V_{ca}^*=V_c^*-V_a^*$.

This inverter is characterized by the advantages shared with the H-bridge inverter presented above: robust, high quality, and well-regulated AC output for a wide range of power factor loads, voltage-based control without the need for separate start-up management, the ability to power highly nonlinear loads, effectively instantaneous synchronization with the reference (allowing to quickly disconnect from and/or reconnect to the grid when used as a grid-tie inverter), and multiple ways to optimize efficiency and the cost-size-weight-performance tradespace.

Figure 31:
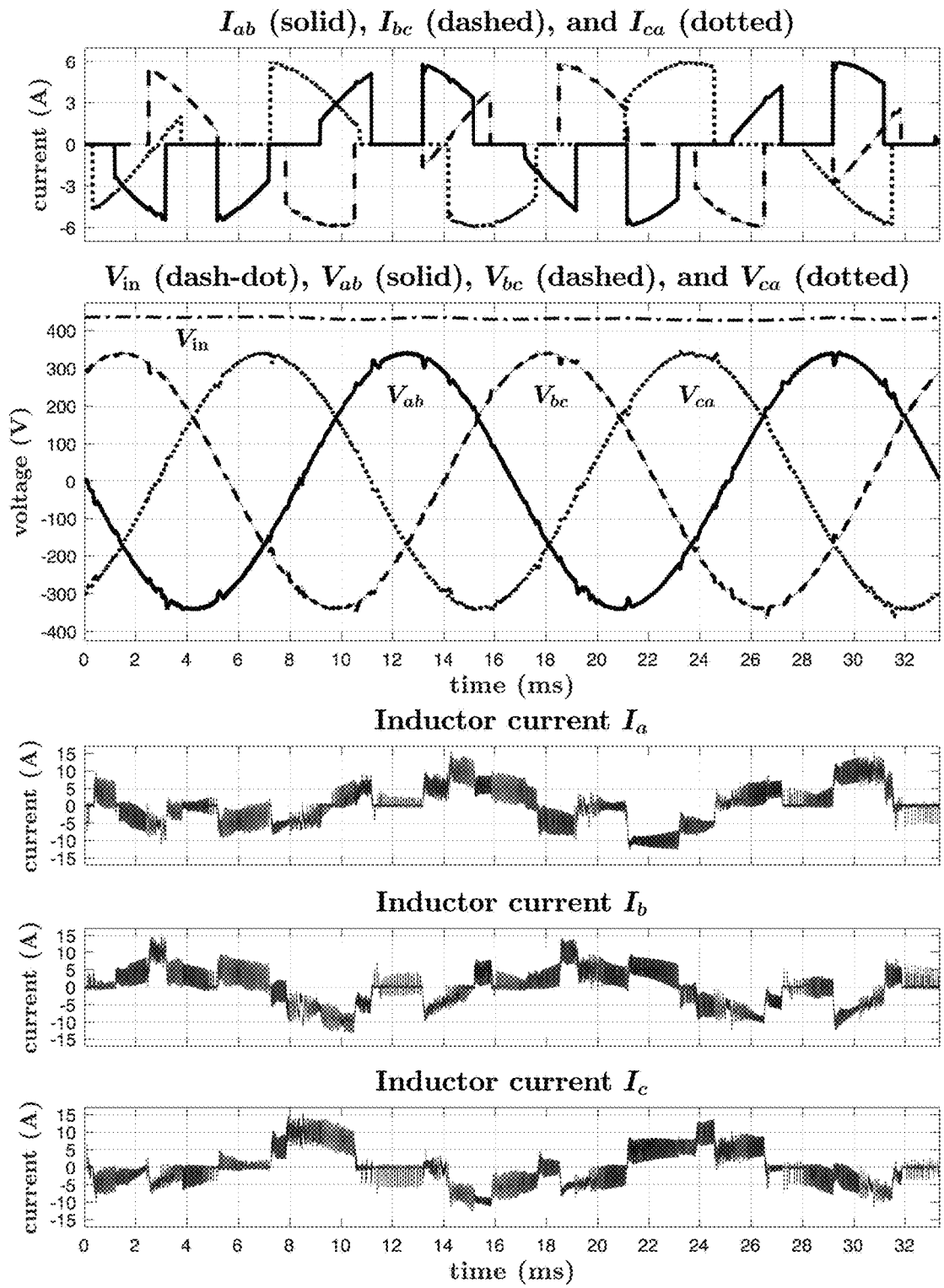
FIG. 31. Example of full-range transient waveforms for the ICM-controlled 3-phase inverter shown in FIG. 30.

For example, FIG. 31 illustrates transient output voltages and currents, and the inductor currents, for a particular implementation of a 3 kW ICM-controlled 3-phase inverter shown in FIG. 30, in response to full-range (and independent of each other) step changes in the line-to-line resistive loads.

Note that for 3-phase loads that are not significantly unbalanced, the value of the input capacitor may be significantly reduced, in comparison with the single-phase H-bridge inverter, without exceeding the limits on the input current ripples.

Figure 32:
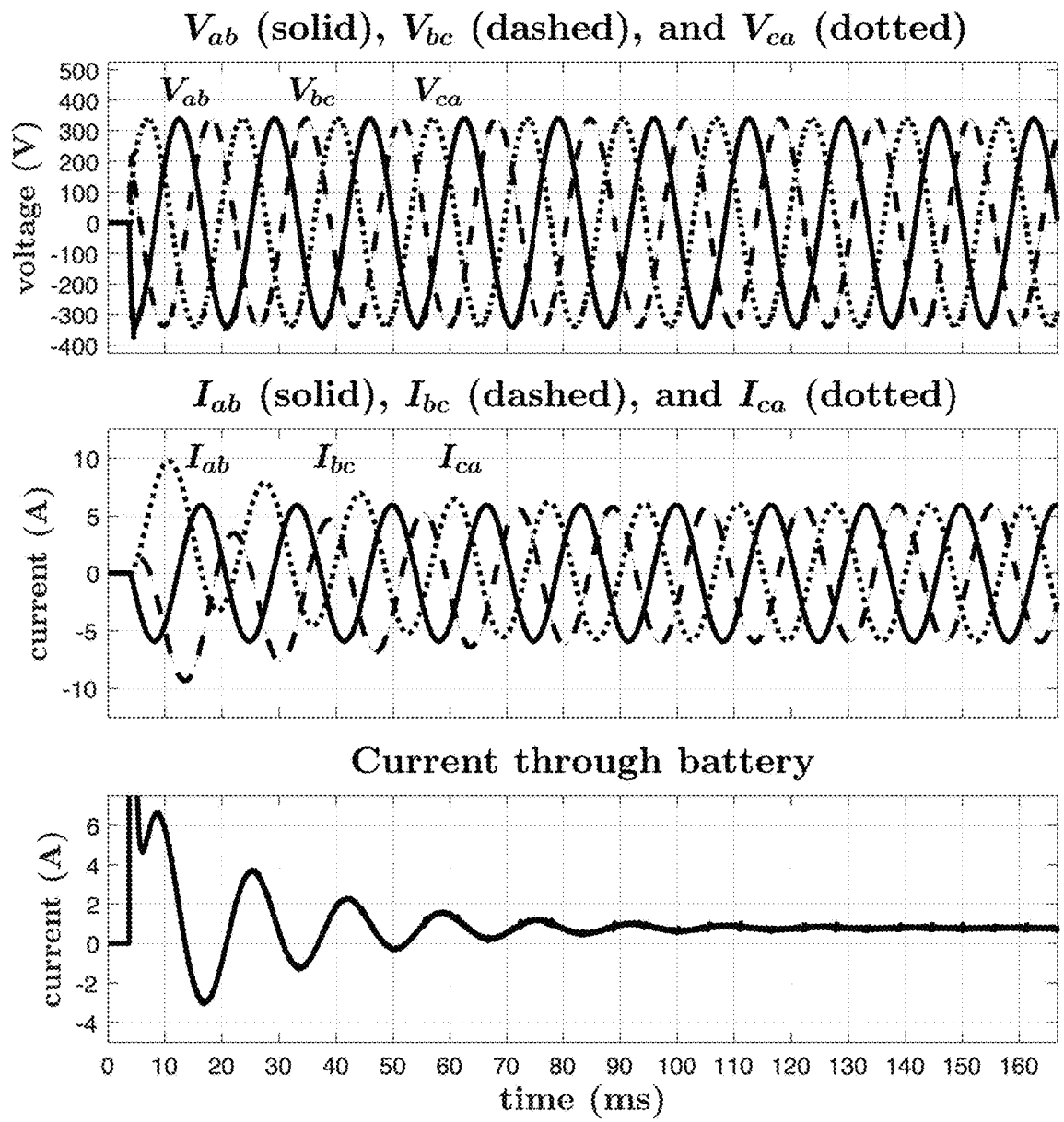
FIG. 32. Startup voltages and currents when the 3 kW ICM-controlled 3-phase inverter shown in FIG. 30 is connected to a low (p.f.=0.1) lagging power factor load in Δ configuration, with the apparent power of about 3 kW.

FIG. 32 illustrates the startup voltages and currents when the 3 kW ICM-controlled 3-phase inverter shown in FIG. 30 is connected to a low (p.f.=0.1) lagging power factor load in Δ configuration, with the apparent power of about 3 kW. Note that the transient current through the battery is bi-directional, going through the discharge-recharge cycles as needed, before the steady-state operation is achieved.

6 Bidirectionality of ICM-Controlled Inverters and AC/DC Converters

Figure 33:
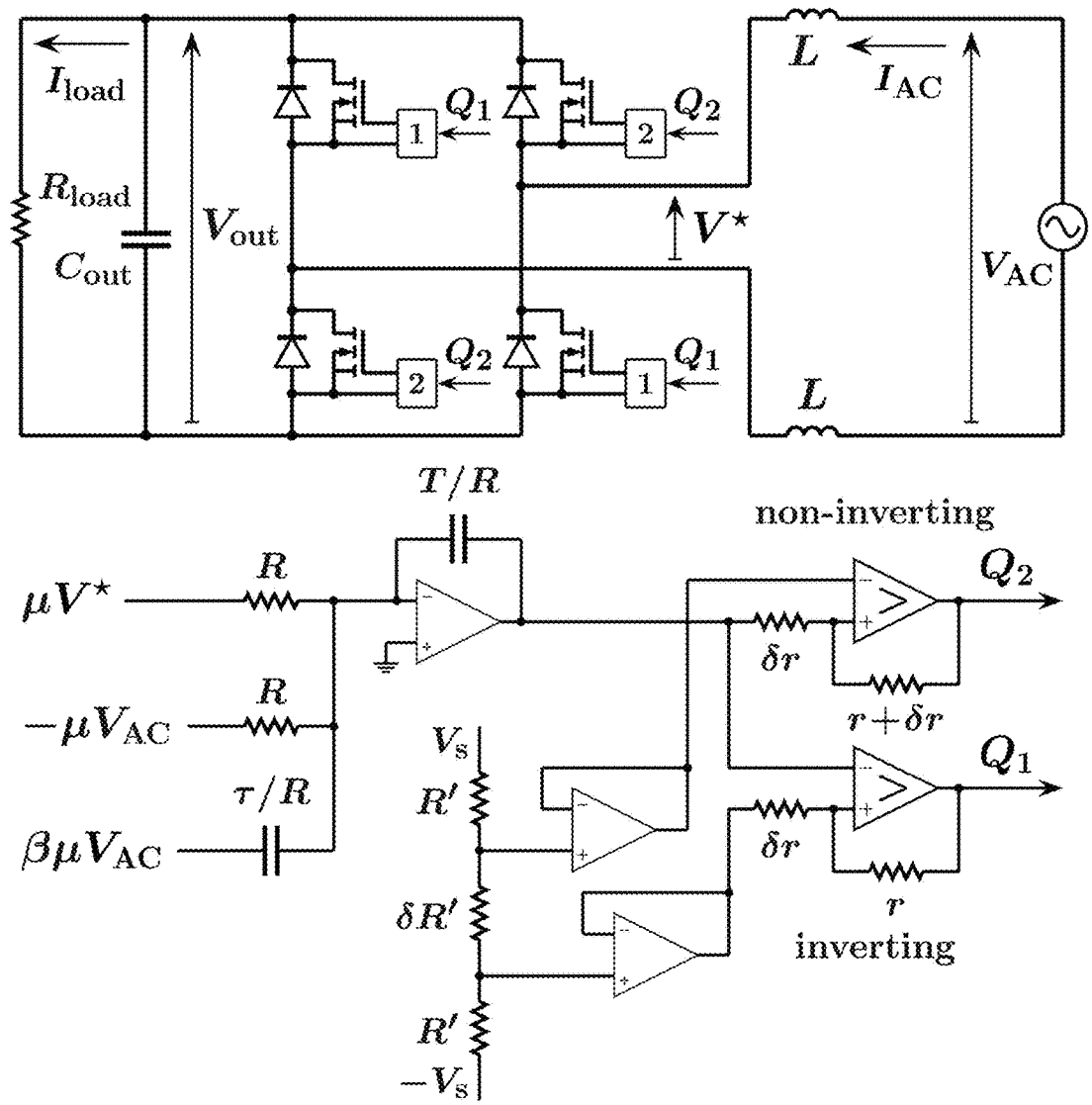
FIG. 33. Example of a single-phase H-bridge ICM-based AC/DC converter with high power factor and low harmonic distortions.

FIG. 33 provides an example of a single-phase H-bridge ICM-based AC/DC converter with high power factor and low harmonic distortions.

As before, let us make a few sensible idealizations, including nearly ideal behavior of the controller circuit, insignificant voltage drops across the components of the bridge, negligible ohmic voltage drops across the reactive components, and constant inductances L and the output capacitance $C_{out}$. We also assume a practical choice of the integrator time constant T in the ICM controller circuit, and the hysteresis gap Δh of the Schmitt triggers, that ensures sufficiently high switching frequencies for the switching ripples in the output voltage to be ignored. This also implies that we can consider an instantaneous value of $V_{AC}$ within a switching cycle to be effectively equal to the average value of $V_{AC}$ over this cycle.

Note that rising and falling edges of an output of a Schmitt trigger happen when its input crosses (effectively constant) respective thresholds. Thus relating the inputs and the output of the integrator in the ICM controller in FIG. 33, differentiating both sides, then averaging between a pair of rising or falling edges of either $Q_1$ or $Q_2$, would lead to $$\bar{V}^* = \bar{V}_{AC} - \beta\tau\bar{V}_{AC}. \quad (9)$$

On the other hand, the line current $I_{AC}$ in FIG. 33 may be related to the line and switching voltages $V_{AC}$ and $V^*$ according to the following equation:

$$\bar{I}_{AC} = \frac{1}{2L}\int dt(\bar{V}_{AC} - \bar{V}^*), \quad (10)$$

and substituting $\bar{V}^*$ from equation (9) into (10) would lead to $$\bar{I}_{AC} = \beta\frac{\tau}{2L}\bar{V}_{AC} + const, \quad (11)$$

where the constant of integration would be determined by the initial conditions and would decay to zero, due to the power dissipation in the converter's components and the load, for a steady-state solution.

Thus in a steady state $\bar{I}_{AC} \beta \tau/2L \bar{V}_{AC} \propto \bar{V}_{AC}$, leading to AC/DC conversion with effectively unity power factor and low harmonic distortions. Note that high power factor in the ICM-based AC/DC converter shown in FIG. 33 is achieved without need for current sensing, and the PFC is entirely voltage-based.

The output parallel RC circuit forms a current filter which, with respect to the input current fed by a current source, acts as a 1st order lowpass filter with the time constant $\tau_{out}=R_{load}C_{out}$, and thus, for sufficiently large $T_{out}$ (e.g. an order of magnitude larger than $f_{AC}^{-1}$), the average value of the output voltage $V_{out}$ would be proportional to the RMS of the line voltage and may be expressed as $$\langle V_{out}\rangle = \left(\eta\beta R_{load}\frac{\tau}{2L}\right)^{\frac{1}{2}}\langle V_{AC}^2\rangle^{\frac{1}{2}} = K\langle V_{AC}^2\rangle^{\frac{1}{2}}, \quad (12)$$

where the angular brackets denote averaging over sufficiently large time interval (e.g. several AC cycles), η is the converter efficiency, and where $\langle V_{AC}^2\rangle^{1/2}$ is the RMS of the line voltage.

For example, for L=195 μH and τ=13.7 μs, 2L/τ≈28.5Ω. Thus for β=1 and 95% efficiency $R_{load}$=120Ω would result in K≈2.

For regulation of the output voltage $V_{out}$, the load conductance may be obtained by sensing both the output voltage and the load current $I_{load}$, and the coefficient β may be adjusted and/or maintained to be proportional to the ratio $I_{load}/V_{out}$.

For example, from equation (12), $$\beta = \frac{2K^2L}{\eta\tau}R_{load}^{-1} = \frac{2K^2L}{\eta\tau}\frac{I_{load}}{V_{out}} \quad (13)$$

would lead to the nominal AC/DC conversion ratio $\langle(V_{out})\rangle/\langle V_{AC}^2\rangle^{1/2}$=K.

Figure 34:
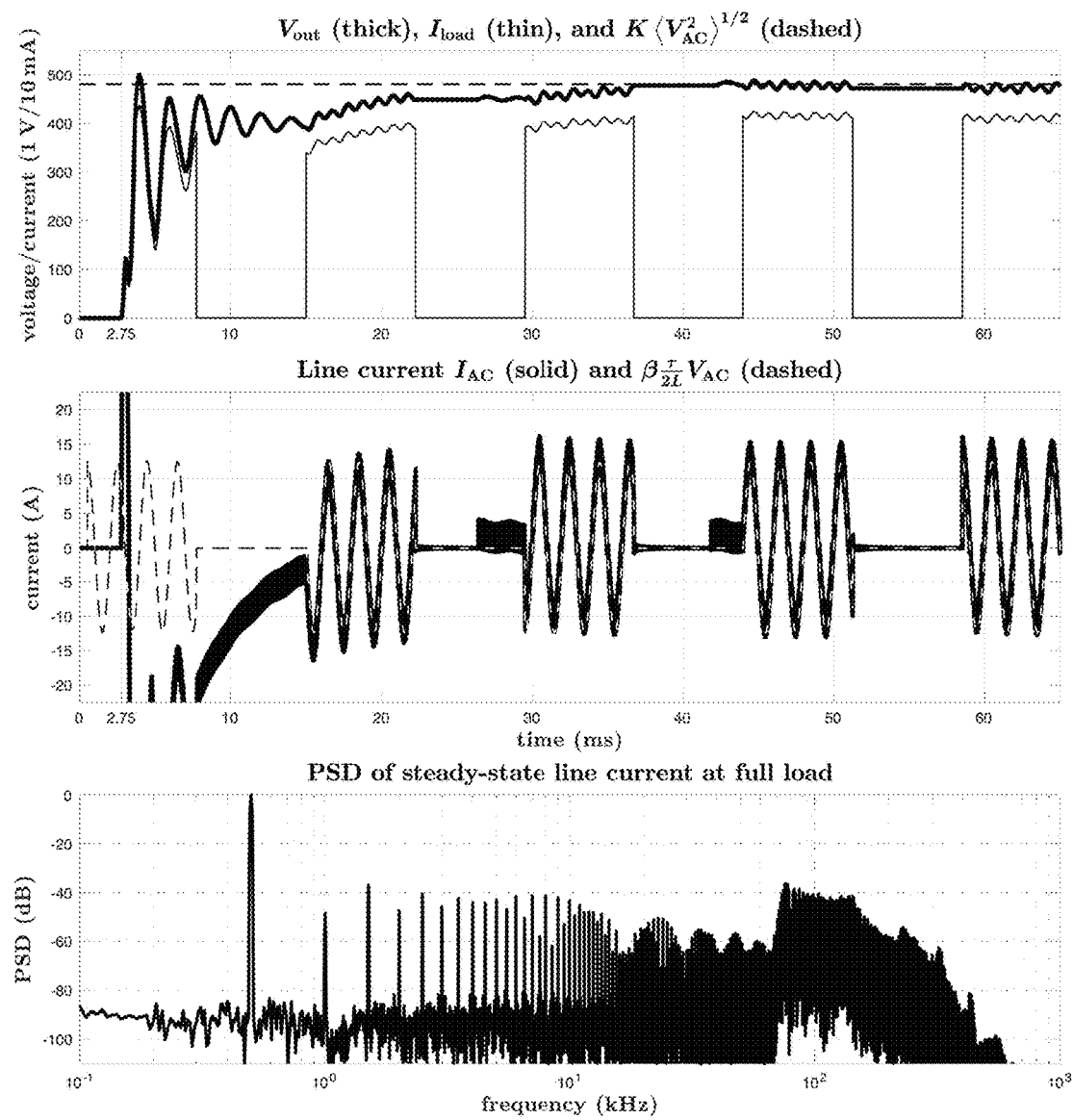
FIG. 34. Illustration of the behavior of a particular implementation of a 2 kW ICM-controlled single-phase AC/DC converter shown in FIG. 33.

FIG. 34 illustrates the behavior of a particular implementation of a 2 kW ICM-controlled single-phase AC/DC converter shown in FIG. 33. In this example, the load conductance switches (effectively instantaneously) between zero and the full load, and the coefficient β is obtained according to equation (13). One should be able to see that, after the converter is powered up (after the AC source is connected at t=2.75 ms), the output voltage converges to the value given by equation (12), and the line current converges to the steady-state current given by equation (11) with const=0. The bottom panel in FIG. 34 shows the PSD of the steady-state current at full load, illustrating that the switching frequency would span a continuous range of values.

Further, additional output voltage regulation based on the difference between the desired nominal ("reference") and the actual ($\langle V_{out}\rangle$) output voltages may be added. For example, a term proportional to the said difference may be added to the parameter β.

REFERENCES

[1] Qing-Chang Zhong and T. Hornik. *Control of Power Inverters in Renewable Energy and Smart Grid Integration*. Wiley, 2013.

[2] R. Bracewell. *The Fourier Transform and Its Applications*, chapter "Heaviside's Unit Step Function, H(x)", pages 61-65. McGraw-Hill, New York, 3rd edition, 2000.

[3] P. A. M. Dirac. *The Principles of Quantum Mechanics*. Oxford University Press, London, 4th edition, 1958.

[4] A. V. Nikitin, "Method and apparatus for control of switched-mode power supplies." U.S. Pat. No. 9,130,455 (8 Oct. 2015).

[5] A. V. Nikitin, "Switched-mode power supply controller." U.S. Pat. No. 9,467,046 (11 Oct. 2016).

[6] "Little box challenge," 26 Mar. 2016. [Online]. Available: https://en.wikipedia.org/wiki/Little_Box_Challenge

[7] "Detailed inverter specifications, testing procedure, and technical approach and testing application requirements for the little box challenge," 16 Jul. 2015. [Online]. Available: https://www.littleboxchallenge.com/pdf/LBC-InverterRequirements-20150717.pdf Regarding the invention being thus described, it will be obvious that the same may be varied in many ways. Such variations are not to be regarded as a departure from the spirit and scope of the invention, and all such modifications as would be obvious to one skilled in the art are intended to be included within the scope of the claims. It is to be understood that while certain now preferred forms of this invention have been illustrated and described, it is not limited thereto except insofar as such limitations are included in the following claims.

I claim:

1. A power inverter converting a DC source voltage into an AC output voltage, wherein said AC output voltage is indicative of an AC reference voltage, wherein said power inverter comprises an H bridge capable of providing a switching voltage, and wherein said H bridge comprises a 1st pair of switches controlled by a 1st control signal and a 2nd pair of switches controlled by a 2nd control signal, said power inverter further comprising:
   a) an integrator characterized by an integration time constant and operable to receive an integrator input signal and to produce an integrator output signal, wherein said integrator output signal is proportional to an antiderivative of said integrator input signal;
   b) a 1st Schmitt trigger characterized by a hysteresis gap and a 1st reference level, and operable to receive a Schmitt trigger input signal and to output said 1st control signal; and
   c) a 2nd Schmitt trigger characterized by said hysteresis gap and a 2nd reference level, and operable to receive said Schmitt trigger input signal and to output said 2nd control signal;
   wherein said integrator input signal comprises a first integrator input component proportional to said switching voltage and a second integrator input component proportional to said AC reference voltage, and wherein said Schmitt trigger input signal comprises a first Schmitt trigger input component proportional to said integrator output signal.

2. The power inverter of claim 1 wherein said integrator input signal further comprises a third integrator input component proportional to a time derivative of said AC output voltage.

3. The power inverter of claim 2 wherein said Schmitt trigger input signal further comprises a second Schmitt trigger input component proportional to a frequency control signal, wherein said switching voltage is characterized by a switching frequency, and wherein said switching frequency is indicative of a frequency of said frequency control signal.

4. The power inverter of claim 3 wherein said frequency control signal is a periodic signal characterized by a time period, and wherein said time period is inversely proportional to said switching frequency.

5. The power inverter of claim 3 wherein said frequency control signal is selected from the group comprising: a random signal, a periodic signal, and any combinations thereof.

6. The power inverter of claim 1 wherein said Schmitt trigger input signal further comprises a second Schmitt trigger input component proportional to said AC output voltage.

7. The power inverter of claim 6 wherein said Schmitt trigger input signal further comprises a third Schmitt trigger input component proportional to a frequency control signal, wherein said switching voltage is characterized by a switching frequency, and wherein said switching frequency is indicative of a frequency of said frequency control signal.

8. The power inverter of claim 7 wherein said frequency control signal is a periodic signal characterized by a time period, and wherein said time period is inversely proportional to said switching frequency.

9. The power inverter of claim 7 wherein said frequency control signal is selected from the group comprising: a random signal, a periodic signal, and any combinations thereof.

10. A power inverter converting a DC source voltage into an AC output voltage, wherein said AC output voltage is indicative of an AC reference voltage, wherein said power inverter comprises an H bridge capable of providing a switching voltage, and wherein said H bridge comprises a 1st pair of switches controlled by a 1st control signal and a 2nd pair of switches controlled by a 2nd control signal, said power inverter further comprising:
   a) an integrator characterized by an integration time constant and operable to receive an integrator input signal and to produce an integrator output signal, wherein said integrator output signal is proportional to an antiderivative of said integrator input signal;
   b) a 1st comparator characterized by a 1st reference level and operable to receive a comparator input signal and to output said 1st control signal; and
   c) a 2nd comparator characterized by a 2nd reference level and operable to receive said comparator input signal and to output said 2nd control signal;
   wherein said integrator input signal comprises a first integrator input component proportional to said switching voltage and a second integrator input component proportional to said AC reference voltage, and wherein said comparator input signal comprises a first comparator input component proportional to said integrator output signal and a second comparator input component proportional to a frequency control signal, wherein said switching voltage is characterized by a switching frequency, and wherein said switching frequency is indicative of a frequency of said frequency control signal.

11. The power inverter of claim 10 wherein said frequency control signal is a periodic signal characterized by a time period, and wherein said time period is inversely proportional to said switching frequency.

12. The power inverter of claim 10 wherein said frequency control signal is selected from the group comprising: a random signal, a periodic signal, and any combinations thereof.

13. The power inverter of claim 10 wherein said integrator input signal further comprises a third integrator input component proportional to a time derivative of said AC output voltage.

14. The power inverter of claim 13 wherein said frequency control signal is a periodic signal characterized by a time period, and wherein said time period is inversely proportional to said switching frequency.

15. The power inverter of claim 13 wherein said frequency control signal is selected from the group comprising: a random signal, a periodic signal, and any combinations thereof.

16. The power inverter of claim 10 wherein said comparator input signal further comprises a third comparator input component proportional to said AC output voltage.

17. The power inverter of claim 16 wherein said frequency control signal is a periodic signal characterized by a time period, and wherein said time period is inversely proportional to said switching frequency.

18. The power inverter of claim 16 wherein said frequency control signal is selected from the group comprising: a random signal, a periodic signal, and any combinations thereof.

19. An AC/DC converter converting an AC source voltage into a DC output voltage, wherein said AC/DC converter comprises an H bridge capable of providing a switching voltage, and wherein said H bridge comprises a 1st pair of switches controlled by a 1st control signal and a 2nd pair of switches controlled by a 2nd control signal, said AC/DC converter further comprising:
   a) an integrator characterized by an integration time constant and operable to receive an integrator input signal and to produce an integrator output signal, wherein said integrator output signal is proportional to an antiderivative of said integrator input signal;
   b) a 1st Schmitt trigger characterized by a hysteresis gap and a 1st reference level, and operable to receive a Schmitt trigger input signal and to output said 1st control signal; and
   c) a 2nd Schmitt trigger characterized by said hysteresis gap and a 2nd reference level, and operable to receive said Schmitt trigger input signal and to output said 2nd control signal;
   wherein said integrator input signal comprises a first integrator input component proportional to said switching voltage, a second integrator input component proportional to said AC source voltage, and a third integrator input component proportional to a time derivative of said AC source voltage, and wherein said Schmitt trigger input signal comprises a first Schmitt trigger input component proportional to said integrator output signal.

20. The AC/DC converter of claim 19 wherein said converter is characterized by an AC/DV voltage conversion ratio and wherein the magnitude of said third integrator input component proportional to a time derivative of said AC source voltage is chosen to provide said AC/DV voltage conversion ratio.

* * * * *